Oct. 10, 1939.  A. A. LAWSON  2,175,474
MACHINE FOR APPLYING PRESSURE TO SHOES
Filed April 13, 1938   12 Sheets-Sheet 1
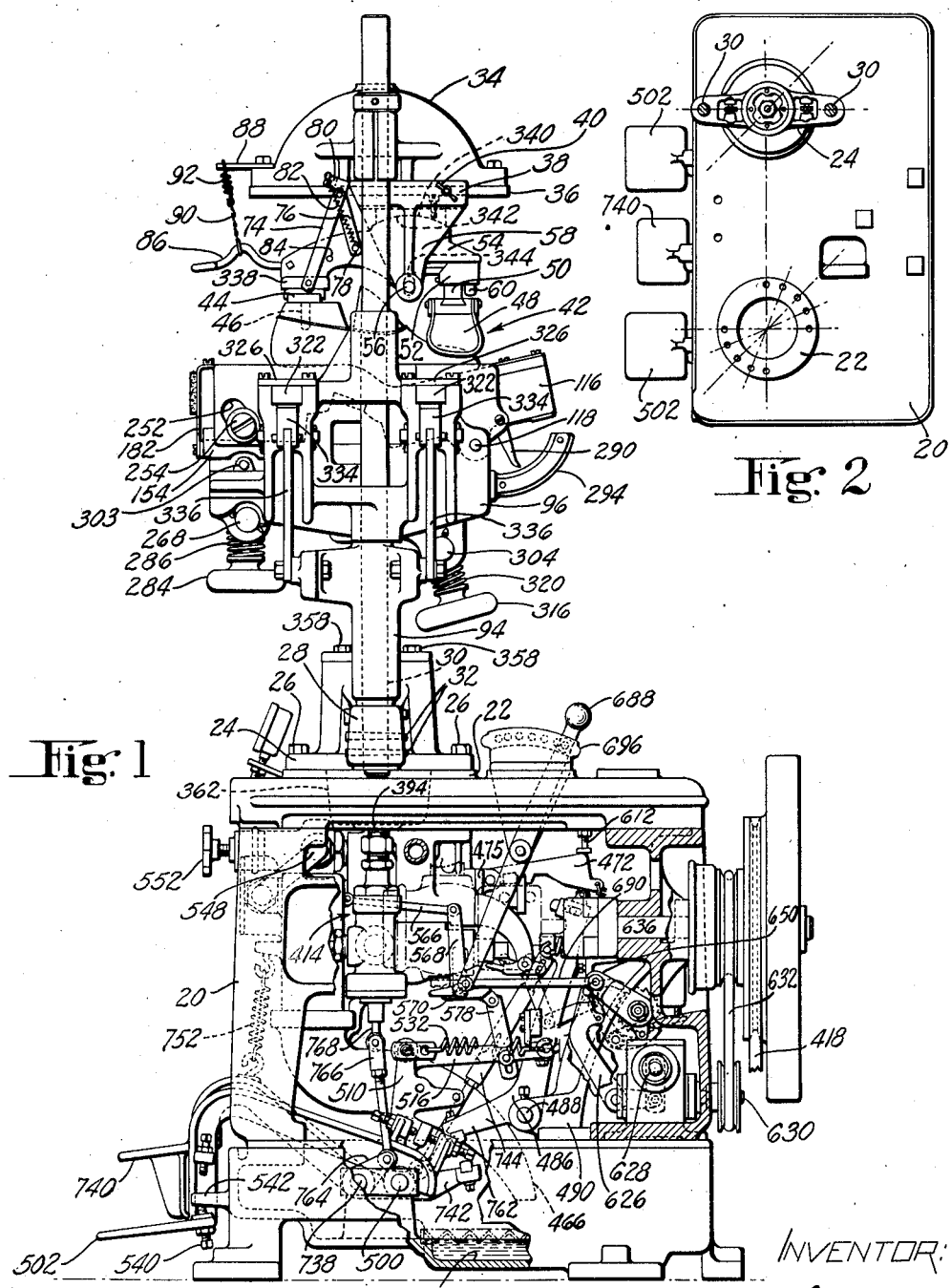
INVENTOR:
Axel A. Lawson
By his attorney
Victor Cobb.

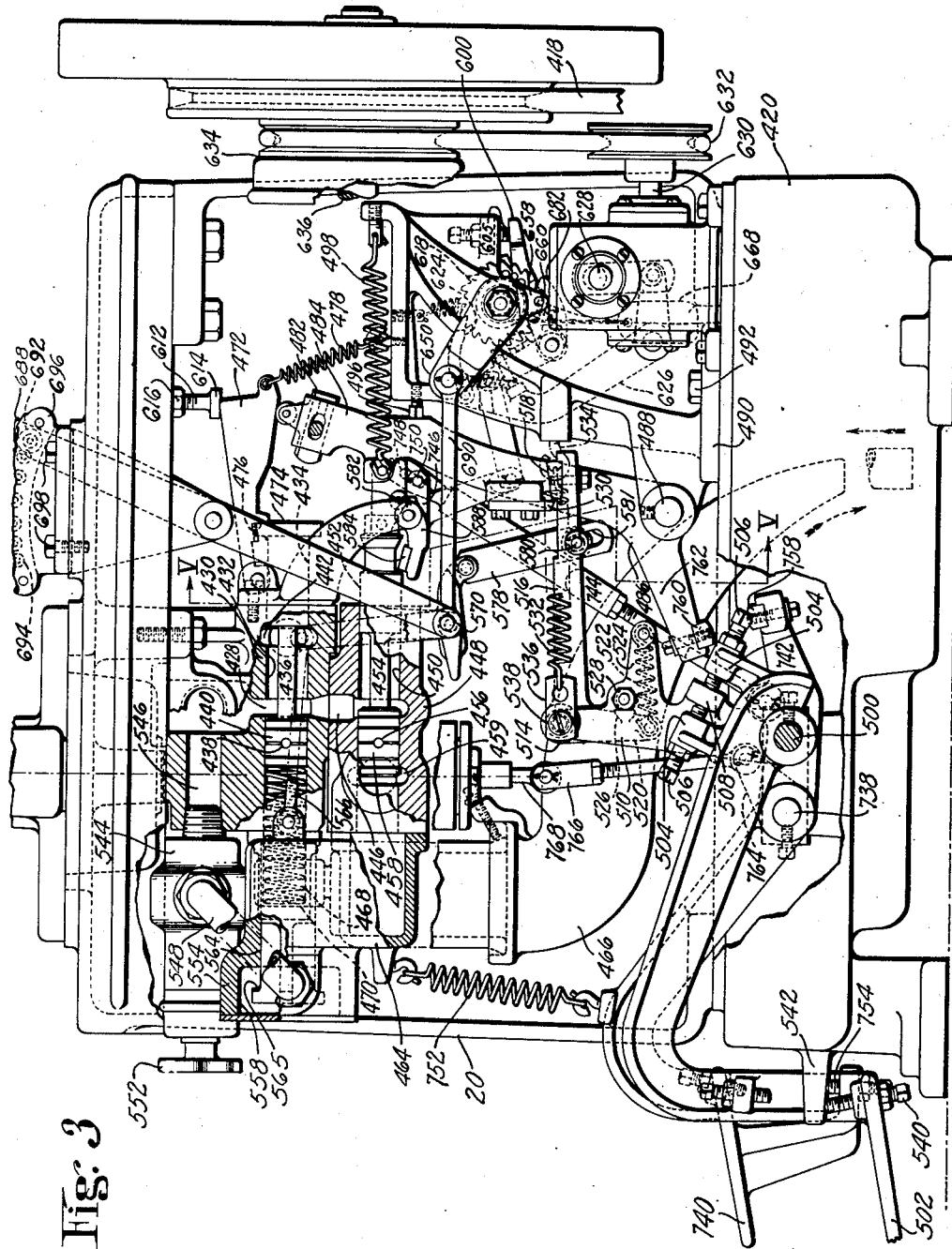

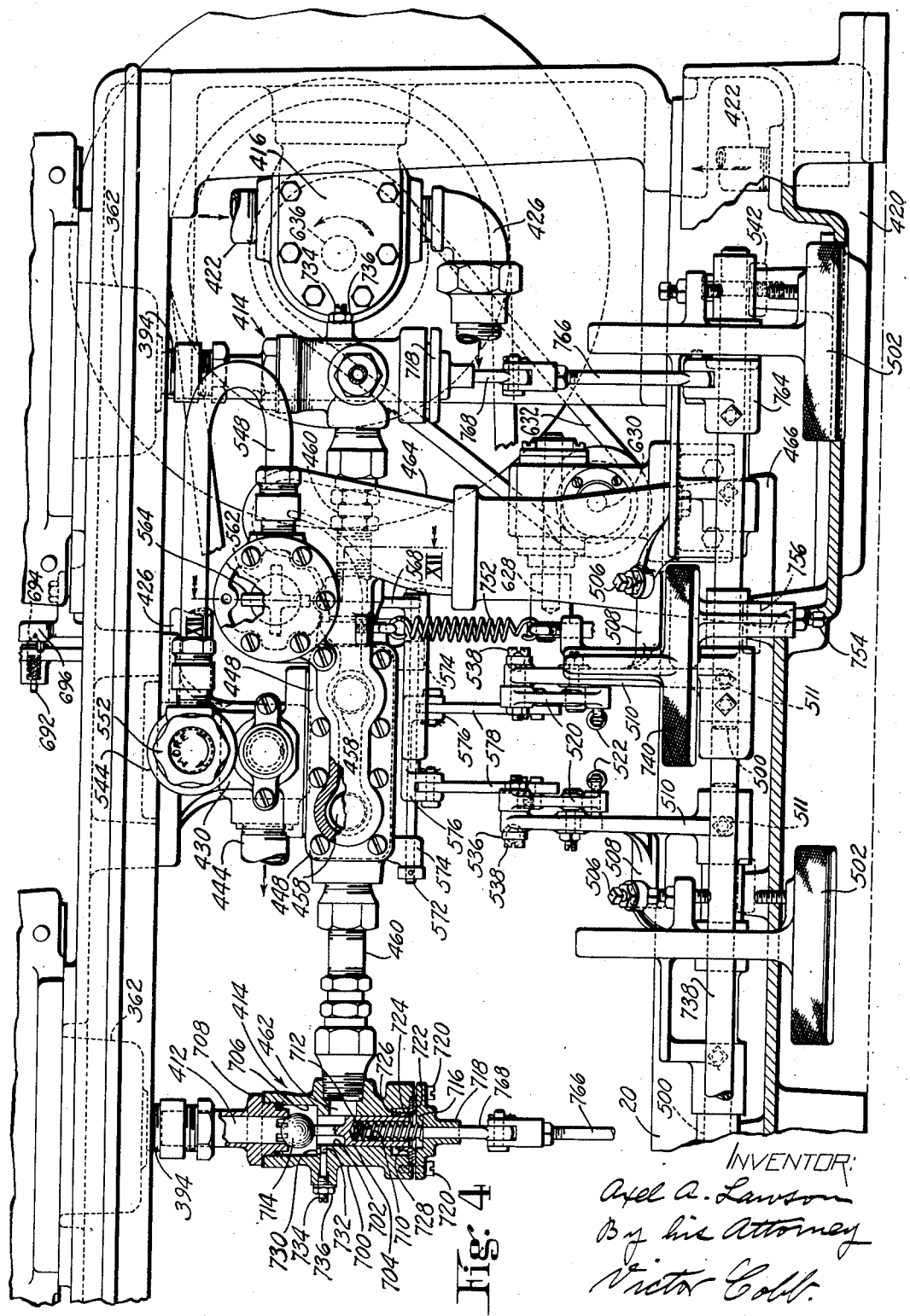

Oct. 10, 1939.  A. A. LAWSON  2,175,474
MACHINE FOR APPLYING PRESSURE TO SHOES
Filed April 13, 1938  12 Sheets-Sheet 4
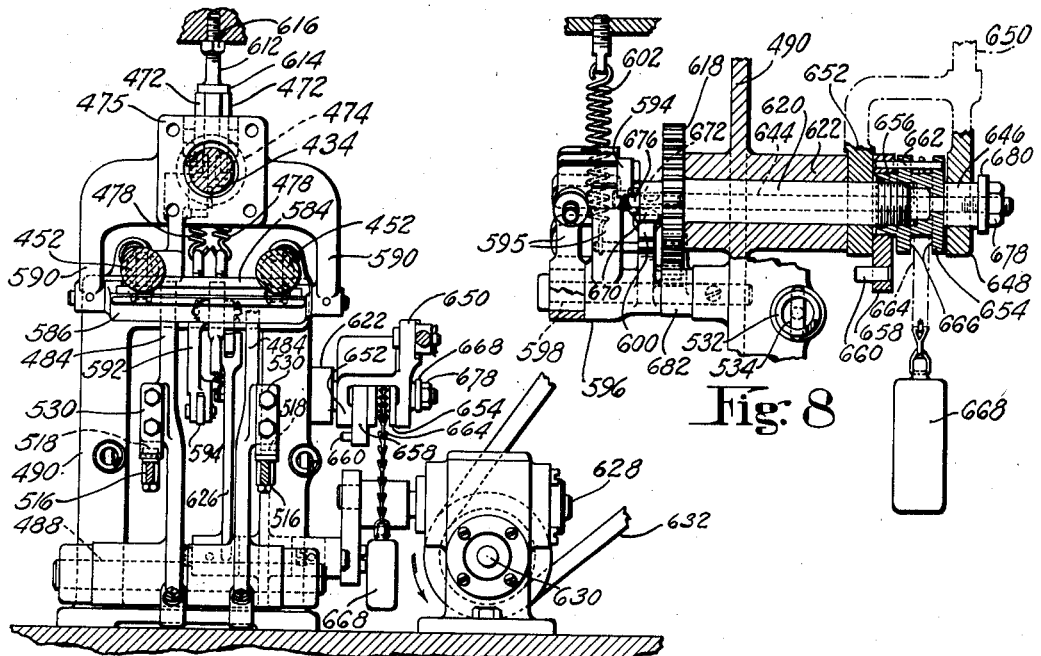
Fig. 5  Fig. 8  Fig. 9
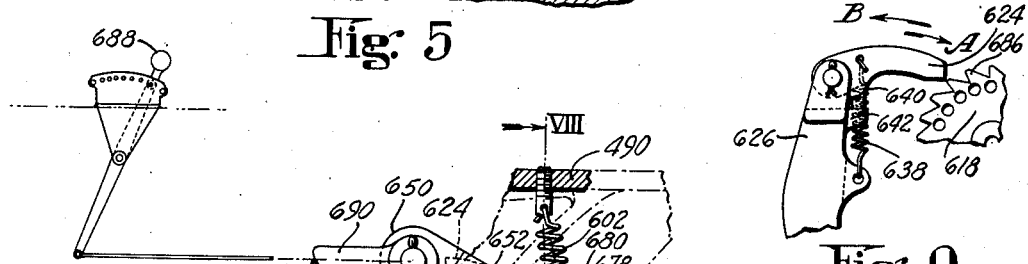
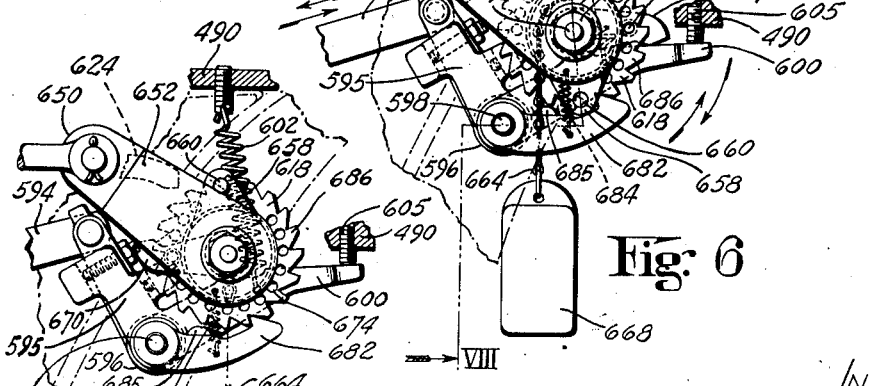
Fig. 6
Fig. 7
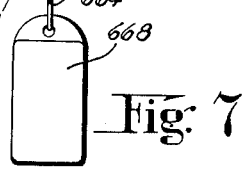
INVENTOR:
Axel A. Lawson
By his attorney
Victor Colt

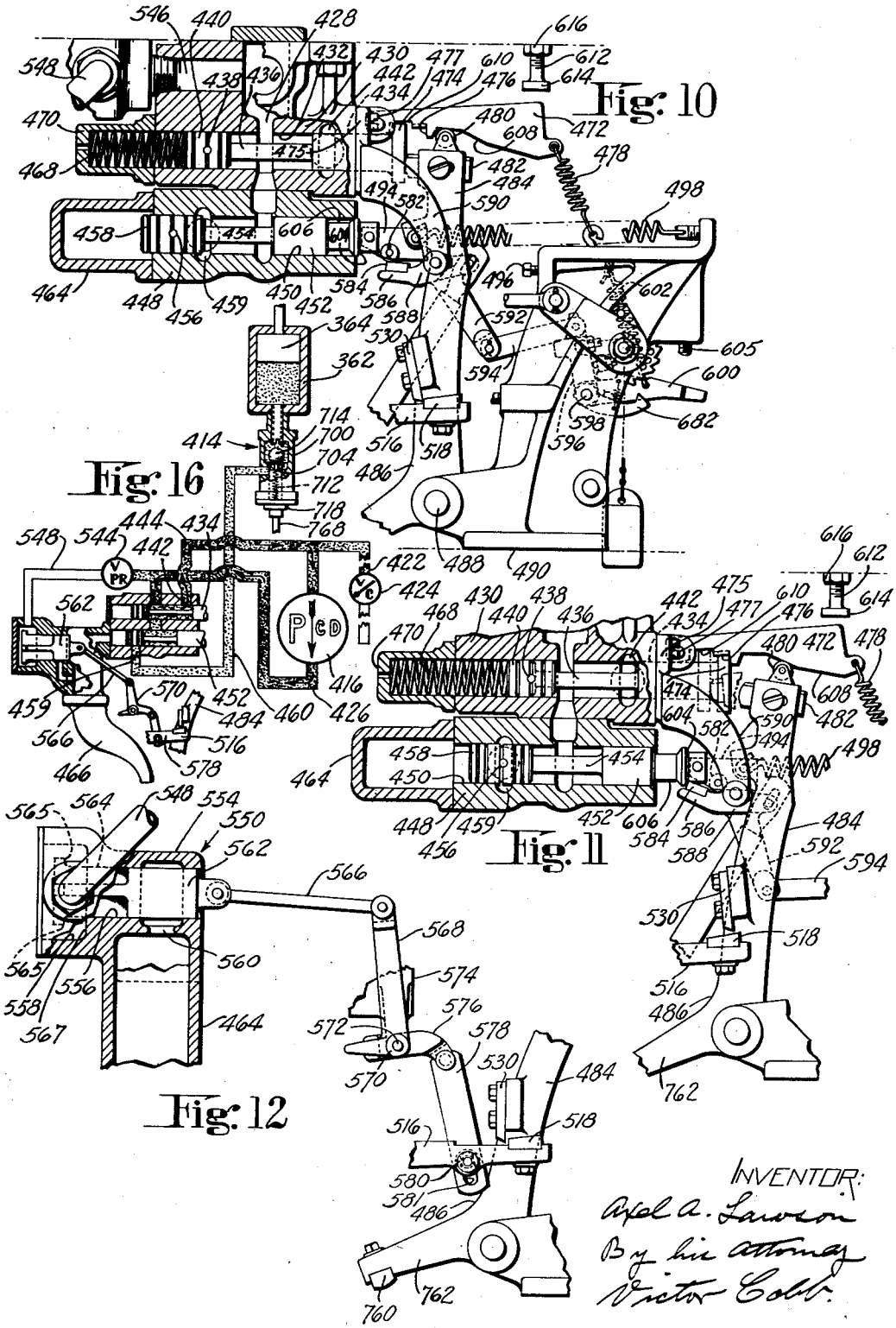

Oct. 10, 1939.  A. A. LAWSON  2,175,474
MACHINE FOR APPLYING PRESSURE TO SHOES
Filed April 13, 1938  12 Sheets-Sheet 6

INVENTOR:
Axel A. Lawson
By his attorney
Victor Cobb

Oct. 10, 1939.　　　　A. A. LAWSON　　　　2,175,474
MACHINE FOR APPLYING PRESSURE TO SHOES
Filed April 13, 1938　　12 Sheets-Sheet 11

INVENTOR

Oct. 10, 1939.  A. A. LAWSON  2,175,474
MACHINE FOR APPLYING PRESSURE TO SHOES
Filed April 13, 1938    12 Sheets-Sheet 12

INVENTOR
Axel A. Lawson
By his Attorney
Victor Colt

Patented Oct. 10, 1939

2,175,474

UNITED STATES PATENT OFFICE 2,175,474

MACHINE FOR APPLYING PRESSURE TO SHOES

Axel A. Lawson, Beverly, Mass., assignor to United Shoe Machinery Corporation, Paterson, N. J., a corporation of New Jersey Application April 13, 1938, Serial No. 201,790

33 Claims. (Cl. 12—51)

This invention relates to machines for applying pressure to shoes in shoe manufacture, and is herein illustrated as embodied in a machine for applying both pressure and heat to the margins of uppers on the bottoms of lasted shoes before outsoles are placed on the shoes. It is to be understood, however, that in various novel and useful aspects the invention is not limited to machines for performing that particular operation.

The present invention provides a novel organization whereby fluid-operated means is utilized to perform the required pressure-applying operation. For the purposes in view the construction shown comprises pressure-applying means arranged to receive and support a shoe placed thereon bottom downward, and a piston which supports the pressure-applying means and is operated by fluid pressure to raise the shoe against an abutment and then to move the pressure-applying means relatively to the shoe to apply the pressure to the bottom of the shoe.

The invention further provides novel means for controlling the pressure fluid, including means for limiting automatically the time during which the shoe remains under pressure. Thus insurance is afforded that, when heat also is applied as illustrated, the shoe will not be subjected to pressure and heat for more than a definite length of time, the construction herein shown being such that the length of time during which the shoe is held under pressure is adjustably variable. For controlling the flow of operating fluid in the illustrated construction there is provided a valve having an inlet, an exhaust and a neutral or pressure retaining position, and automatic means for moving the valve from inlet to neutral position whenever a predetermined pressure of the fluid is attained and for thereafter moving the valve from neutral to exhaust position after the shoe has been maintained under pressure for a definite length of time. More particularly, as further herein illustrated, there is provided a spring which tends normally to hold the valve in exhaust position, operator-controlled means for moving the valve from exhaust to inlet position to render the fluid effective to operate the piston, and means controlled by the pressure fluid for disconnecting the valve and the operator-controlled means to permit reverse movement of the valve. This reverse movement of the valve is limited by a valve-retaining member arranged to hold the valve in neutral position with the shoe under pressure in the machine, this member being operated to release the valve for movement to exhaust position by a timing device which is adjustable by the operator to determine variably the length of time during which each shoe is held under pressure. In order that the operator may, if he wishes, release the shoe from pressure at any time, there is provided, in accordance with a further feature, means controlled by the operator for moving the above-mentioned member out of valve retaining position, this means being further movable to insure the return of the valve to exhaust position.

Bottom-pressing machines are commonly provided with two sets of operating instrumentalities for applying pressure to shoes in different locations in the machine. The different sets of instrumentalities, in the machine herein shown, are operated by separate fluid pressure mechanisms, and separate valve mechanisms are provided, each movable independently of the other to render the fluid effective to operate one of the two sets of instrumentalities, the movements of each valve from inlet to neutral position and from neutral to exhaust position being controlled automatically in the manner above described. Preferably, and as illustrated, the above-mentioned valve retaining member is arranged to hold either one of the two valves in neutral position; and in accordance with still another feature of the invention means is provided for operating this member to release that valve which is in neutral position upon movement of the other valve from exhaust to inlet position. Thus the operator may accelerate the operation and increase the output of the machine by moving either one of the two valves from exhaust to inlet position to cause a shoe to be subjected to pressure in one-half of the machine and to cause the release from pressure of another shoe previously operated upon in the other half of the machine prior to the action of the timing device on the above-mentioned valve retaining member.

The above and other features of the invention including various novel details of construction and combinations of parts will now be more particularly described by reference to the accompanying drawings and pointed out in the claims.

In the drawings:

Fig. 1 is a view in right-hand side elevation of a machine in which the present invention is embodied, the right-hand unit being removed, and a portion of the base being broken away and other parts being shown in section to illustrate more clearly the construction thereof;

Fig. 2 is a plan view of the base of the machine;

Fig. 3 is a view, on an enlarged scale, partly in right-hand side elevation and partly in section, of the base of the machine, showing the main valves of the fluid pressure means and their operating connections;

Fig. 4 is a view partly in front elevation and partly in section of a portion of the mechanism shown in Fig. 3;

Fig. 5 is a section on the line V—V of Fig. 3;

Fig. 6 is a detail in front elevation, on an enlarged scale, of the timing device associated with the valve operating mechanism, the parts being shown in the positions that they assume before use;

Fig. 7 is a view similar to Fig. 6 but illustrating the positions of the parts at the beginning of the timing operation;

Fig. 8 is a section on the line VIII—VIII of Fig. 6;

Fig. 9 is a detail in side elevation of parts of the timing device;

Fig. 10 is a view partly in section and partly in right-hand side elevation of the valve mechanism and associated parts in the positions they assume substantially at the beginning of the cycle of the machine;

Fig. 11 is a similar view of a portion of the mechanism shown in Fig. 10 but illustrating the relative positions of the parts with a shoe under pressure in the machine;

Fig. 12 is a view partly in right-hand side elevation and partly in section on the line XII—XII of Fig. 4;

Figure 13:
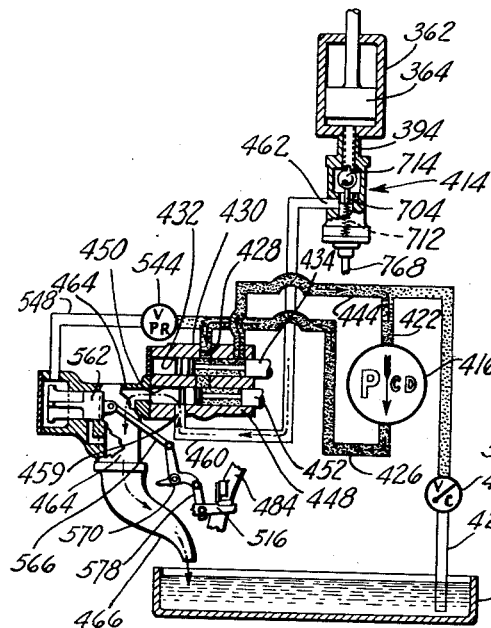
Figure 14:
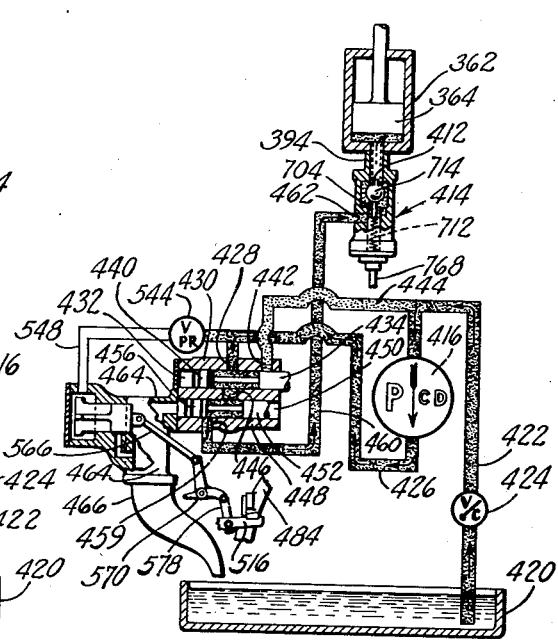
Figure 15:
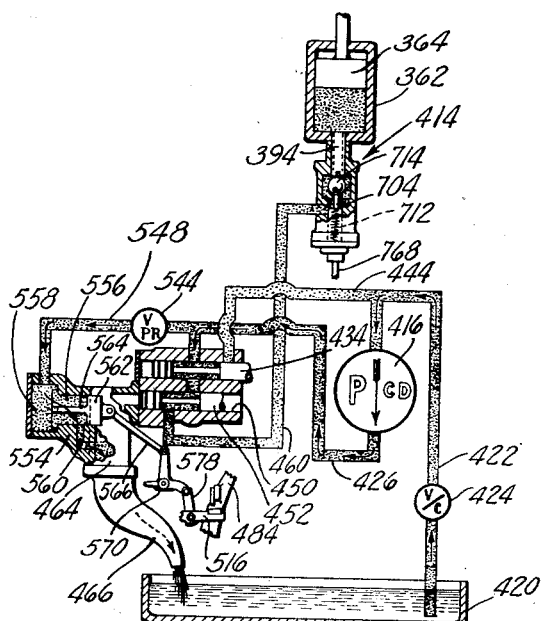
Figure 17:
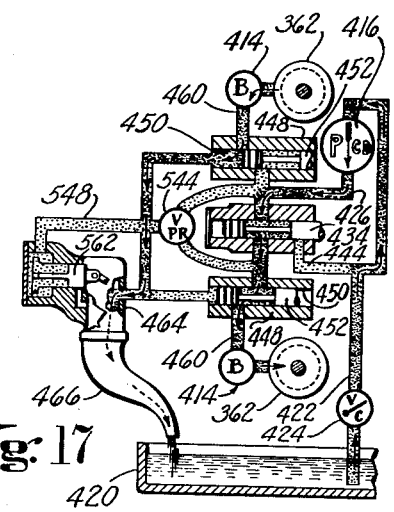
Figure 18:
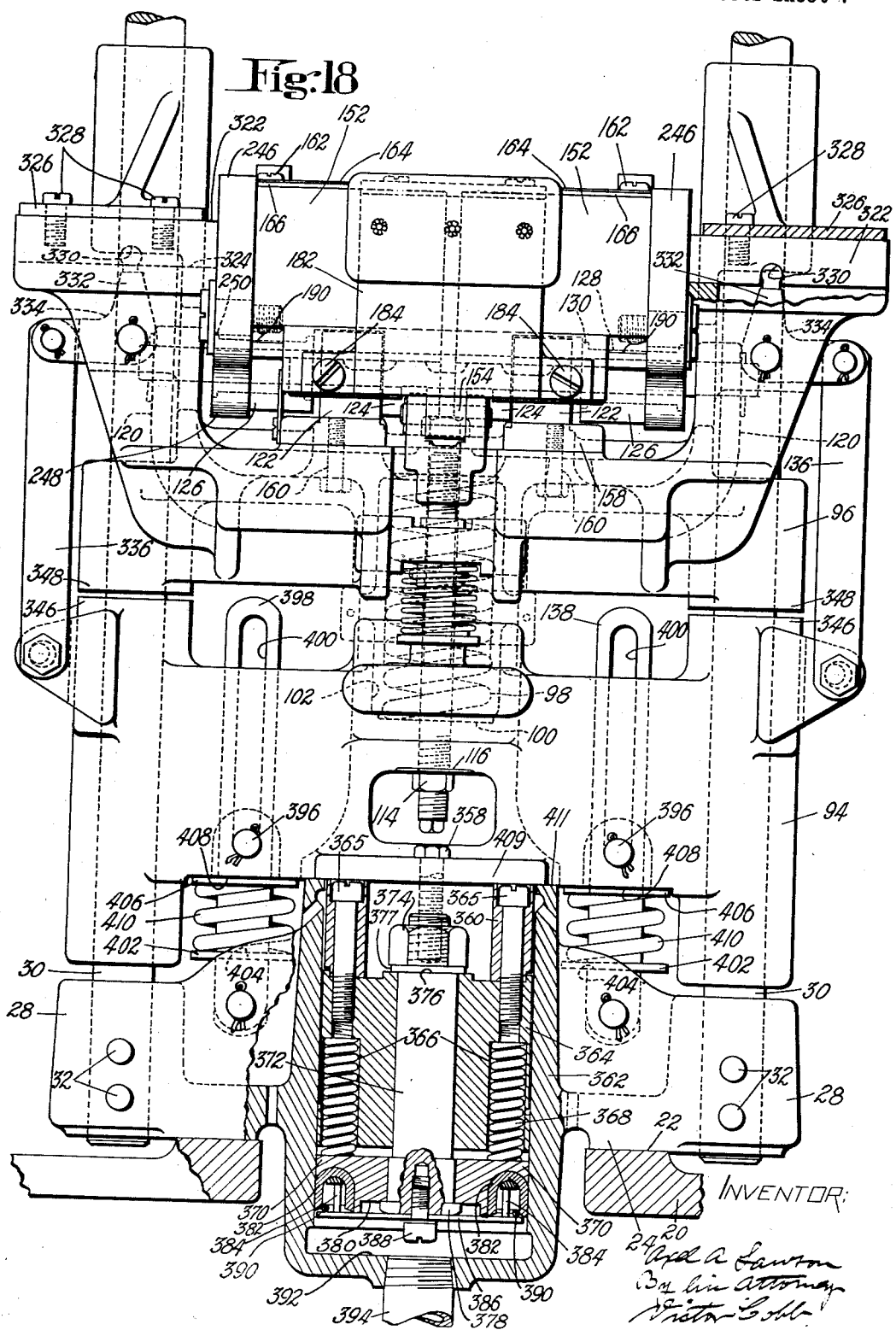
Figure 19:
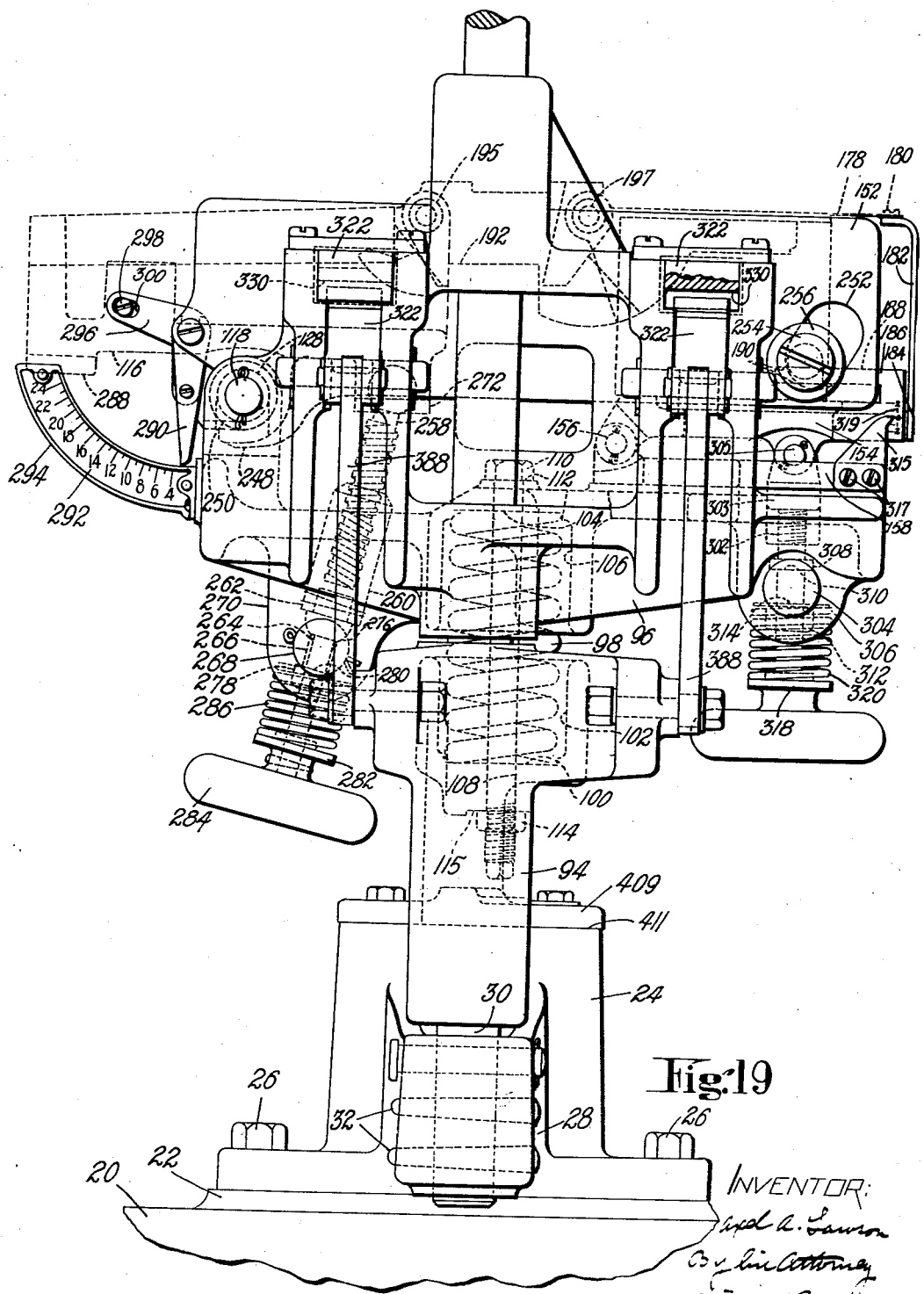
Figure 20:
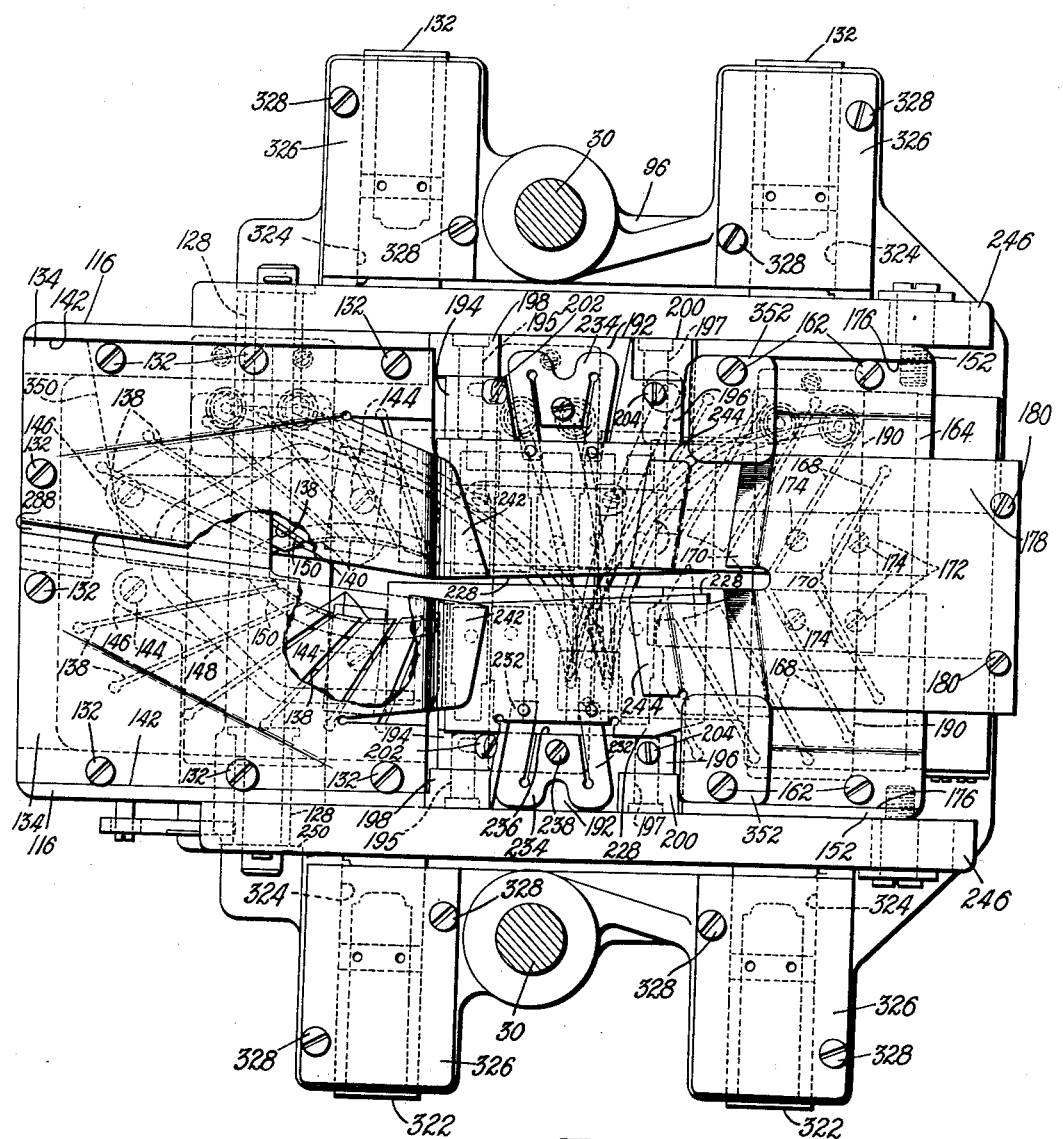
Figure 21:
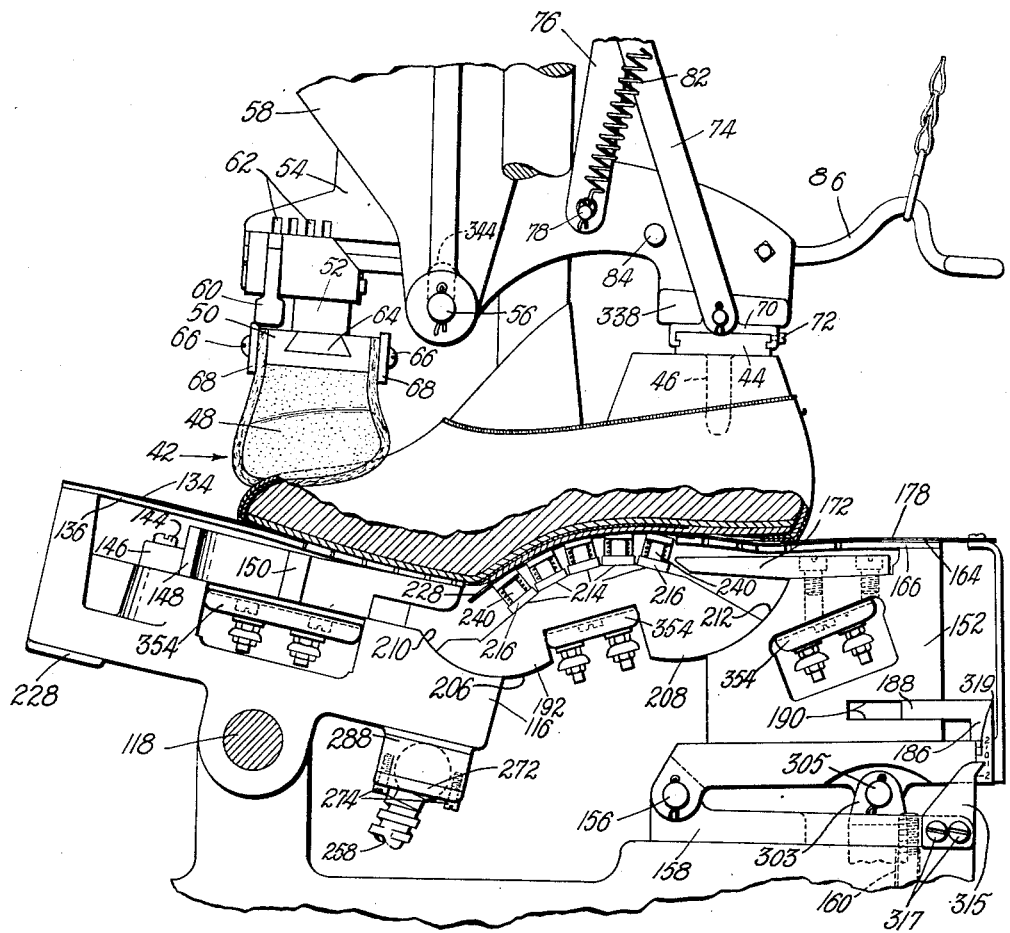
Figure 22:
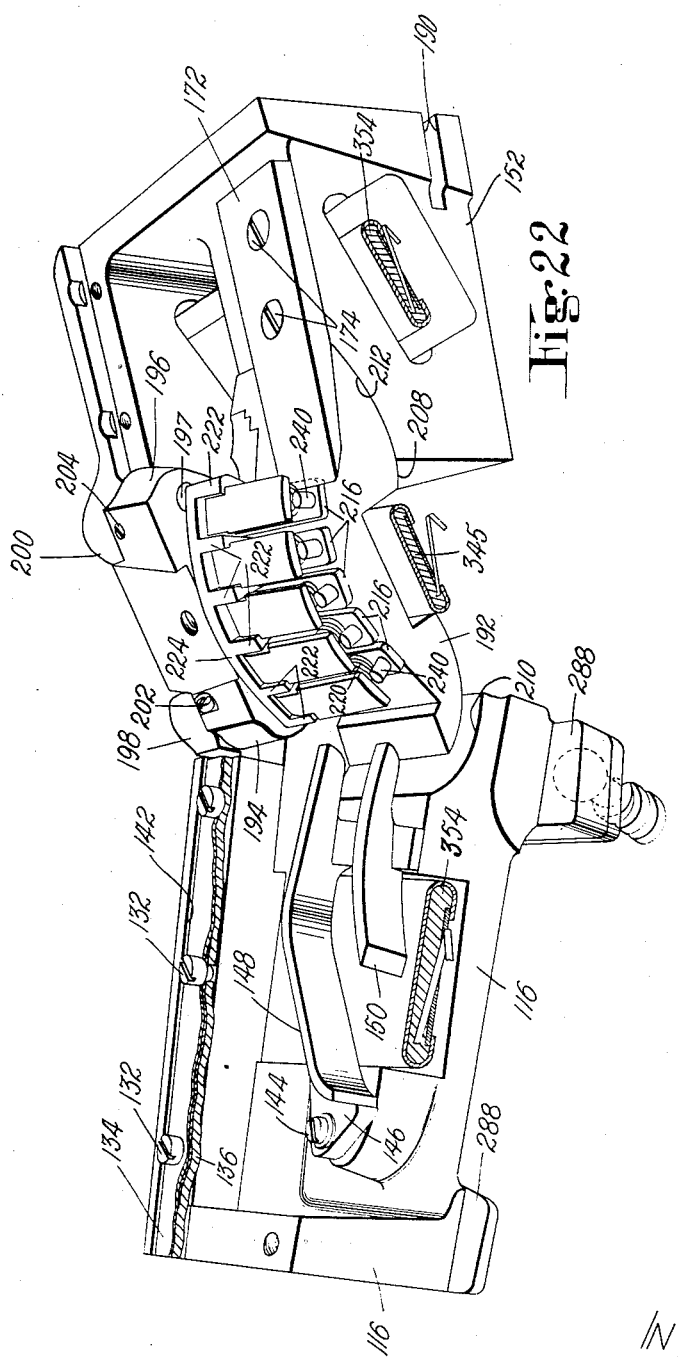
Figure 23:
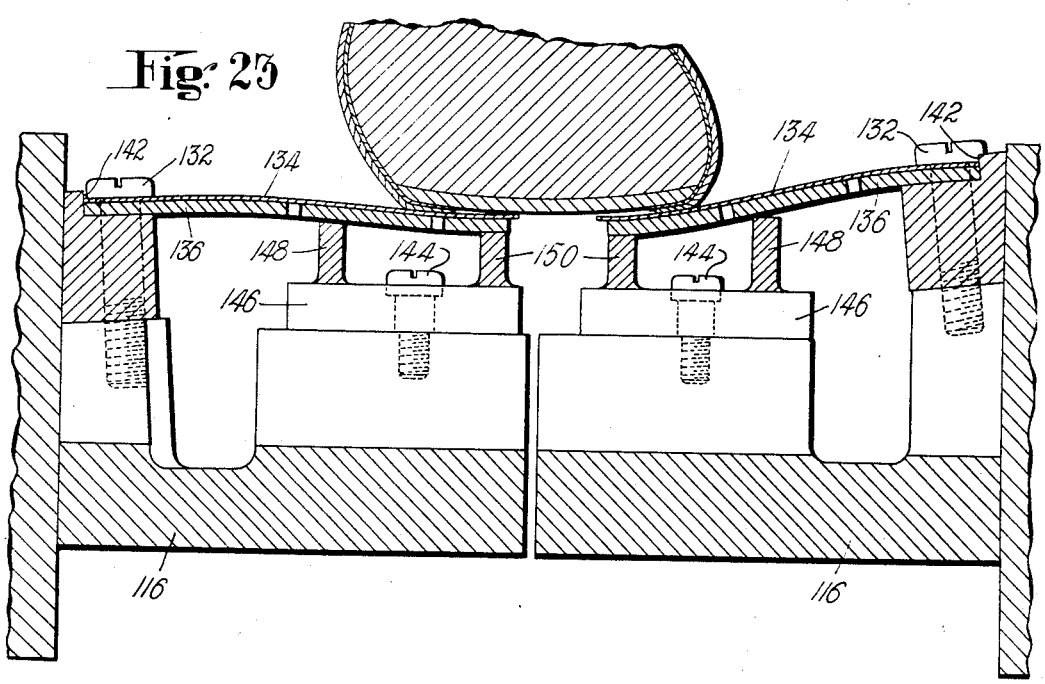
Figure 24:
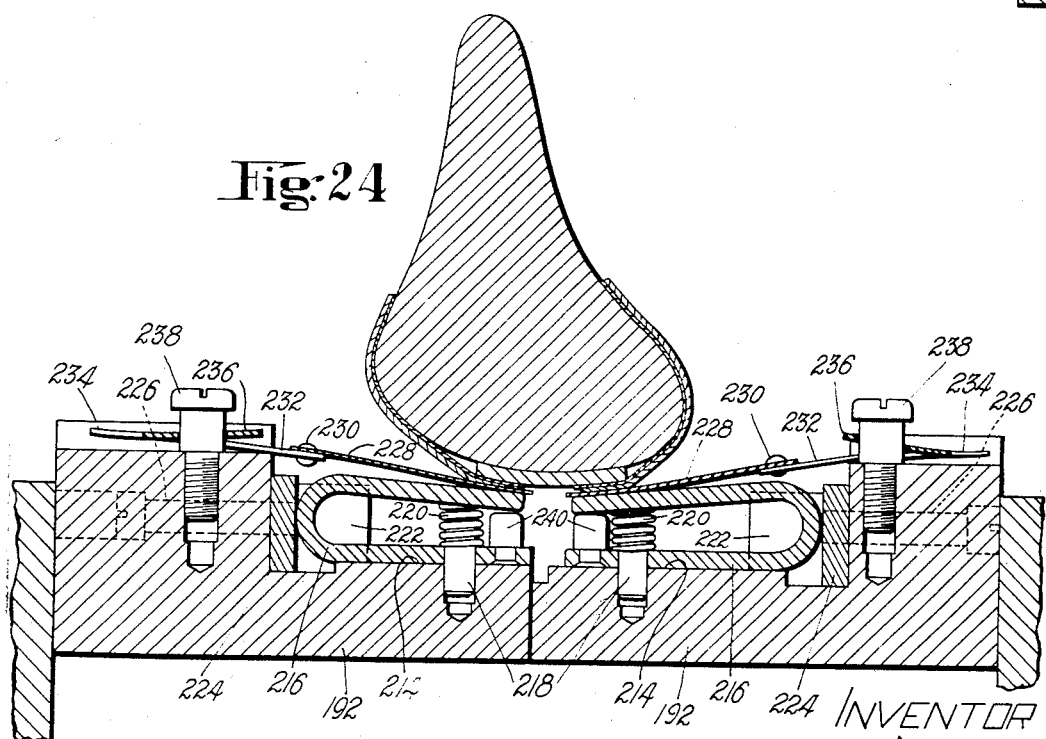

Figs. 13, 14, 15 and 16 are diagrammatic views of the fluid pressure operating means and the several valves for controlling the flow of the operating fluid, the relative positions of the valves being shown in Fig. 13 at the time when the machine is initially at rest, in Fig. 14 substantially at the beginning of the cycle of operations, in Fig. 15 substantially at the time of the operation of the pressure release valve, and in Fig. 16 with a shoe under pressure in the machine;

Fig. 17 shows diagrammatically the fluid pressure operating means with the valves in position to stop the free circulation of the operating fluid, to direct the fluid to one of the cylinders and to permit the exhaust of fluid from the other cylinder;

Fig. 18 is a view in front elevation of the upper left-hand portion of the machine;

Fig. 19 is a view in left-hand side elevation of the portion of the machine shown in Fig. 18;

Fig. 20 is a plan view of the shoe bottom pressing or ironing means and parts associated therewith;

Fig. 21 is a view partly in left-hand side elevation and partly in section showing the ironing units for engaging the bottom of the forepart, shank and heel-end portions of the shoe at one side only with the shoe under pressure in the machine;

Fig. 22 is a perspective view of the ironing units shown in Fig. 21 with the ironing members removed; and Figs. 23 and 24 are cross-sectional views through the forepart and shank ironing units respectively illustrating the positions of the parts at the end of the ironing operation.

The machine herein shown is a twin machine comprising two sets of instrumentalities whereby one shoe may be subjected to pressure simultaneously with the release from pressure of another shoe previously operated upon. Since the two sets are constructed substantially alike except that they are used to operate respectively on right and left shoes, the present description will be confined for the most part to only one set.

The machine comprises a base 20 provided with a boss 22 upon which there is seated a bracket 24 fastened to the base by screws 26. The bracket 24 has a pair of laterally extending bosses 28 each of which is bored to receive a vertical rod 30 secured to the boss by tapered pins 32. The vertical rods 30 (Fig. 1) support adjustably near their upper ends a crosshead 34 to which there is secured a plate 36 on which is mounted for sliding movements lengthwise of the shoe a carrier 38 for a work support or jack which may be and as illustrated is substantially like that shown in United States Letters Patent No. 2,095,245, granted on October 12, 1937, upon an application of S. J. Finn, this jack serving to support the shoe against pressure applied on its bottom face. For holding the carrier against sliding movement on the plate there is provided a thumb screw 40 which extends through the carrier and is arranged to engage the plate 36. The jack comprises a shoe rest 42 for engaging the shoe or last at the top of the forepart and a heel-end support 44 which engages the top of the cone of the last. In order to hold the shoe effectively against tipping movement laterally of the shoe as pressure is applied to its bottom face, the heel support 44 includes a last pin 46 arranged to extend into the spindle hole in the heel end of the last. The shoe rest 42 in the construction herein shown comprises a leather covered pad 48 of rubber or other suitable material which is hollowed out laterally of the shoe and is mounted on a block 50 adjustably secured to a second block 52 mounted for sliding movements in directions lengthwise of the shoe on a rocking member 54. The member 54 is mounted on a laterally extending rod 56 supported by the depending spaced arms 58 of the carrier 38. Pivotally mounted on the block 52 is a spring-controlled latch 60 arranged to engage any one of the series of recesses 62 (Fig. 21) formed in the member 54 to hold the block 52 in adjusted position lengthwise of the shoe. Formed on the block 52 is a dovetail-shaped tongue 64 extending laterally of the shoe and arranged to enter a similarly shaped groove in the block 50. The block 50 is held in adjusted position laterally of the shoe on the block 52 by means of set screws 66 carried by the block 50 and arranged to engage the tongue 64, lock nuts 68 being provided for holding the set screws in locking engagement with the tongue. It will be readily seen that the above construction permits the shoe rest 42 to be adjusted in directions both lengthwise and widthwise of the shoe as required for shoes of different sizes and styles. The heel-end support 44 for engaging the top of the cone of the last is freely movable in directions widthwise of the shoe along guideways formed in a holder 70, a screw 72 in the holder being provided for limiting such movement of the heel-end support relatively to the holder. For permitting free swinging movements of the holder 70 in directions lengthwise and heightwise of the shoe there are pivotally connected to its opposite sides equal links 74 the ends of which remote from the holder are pivotally connected to a pair of equal links 76 pivotally mounted one on each side of the member 54 on a pin 78 carried by this rocking member. Extending between the opposite end portions of the pin 78 and upwardly extending portions 80 (Fig. 1) of the links 74 are springs 82 which tend to hold the links 74, 76 in substantially parallel relation with the links 76 in engagement with stops, illustrated as pins 84, projecting from the member 54 and with the holder 70 in engagement with the loop-shaped end of a rod 86 projecting from one end of the member 54. Connected at one end to a plate 88 fastened to the crosshead 44 and at the other end by means of a short chain 90 to the rod 86 is a spring 92 which tends to hold the rocking member 54 in a substantially horizontal position with the heel pin 46 substantially vertical.

Mounted on the rods 30 is a slide 94 (Figs. 1, 18 and 19) to which upward movements are imparted by means hereinafter more particularly described. Slidingly mounted on the rods 30 above the slide 94 is a casting 96 supported by a spring 98 which is arranged to yield in response to resistance of the shoe to the pressure applied. At its lower end the spring 98 engages a shoulder 100 formed within a central recess 102 in the slide 94 and at its upper end the spring engages a shoulder 104 within a recess 106 in the casting 96 in vertical alinement with the central recess 102. Initially the spring 98 is under slight tension and acts to hold the casting 96 in spaced relation to the slide 94 determined by the effective length of a bolt 108 which is carried by the casting 96 and extends downwardly through an opening in the slide 94, the head 110 of the bolt engaging a shoulder 112 on the casting 96 and a nut 114 threaded on the opposite end of the bolt engaging a finished surface 115 on the slide 94.

The casting 96 serves to support shoe bottom pressing or ironing devices arranged to engage the bottom of the shoe along the opposite sides of its forepart, shank and heel-end portions. As more particularly hereinafter described, the pressing devices are relatively adjustable heightwise of the shoe to accommodate shoes of different styles and as herein illustrated the devices or units are arranged in pairs to act respectively on the bottom of the forepart, shank, and heel-end portions of the shoe. The ironing units for engaging the lasted margin of the upper at the opposite sides of the forepart, each comprising a holder 116 (Figs. 19, 20, 21, 22 and 23), are pivotally and slidably mounted upon a shaft 118 supported by upwardly extending arms 120 (Fig. 18) and bosses 122 on the casting 96, the shaft extending through a boss 124 formed on each of the holders 116. Formed also on each of the holders 116 is a boss 126 which is slotted to receive a bushing 128 on the shaft 118 and is counterbored to receive the head 130 of the bushing. Secured to each holder 116 by screws 132 is a thin shoe-engaging or ironing plate 134 of resilient metal and a relatively thick plate 136 of resilient metal for supporting the plate 134, these plates being mounted in superposed contiguous relation and being shaped substantially to conform to the lengthwise curvature of the bottom of the forepart of the shoe. Extending outwardly from the inner edge of the plate 136 in directions substantially normal to the edge curvature of the forepart of a shoe are a plurality of slots 138 which divide the plate into a series of spring fingers 140. The outer edges of the plates 134, 136 engage a shoulder 142 on the holder 116 and secured to the holder by screws 144 is a member 146 having curved ribs 148, 150 formed thereon for limiting the downward movement of the fingers 140, the rib 150 being arranged to engage the inner end portions of the spring fingers 140 with the rib 148 in engagement with the downwardly bent fingers 140 at the toe end in locations beyond the outer edge of the last bottom.

The heel-end ironing units each comprise a holder 152 (Figs. 18, 19, 20, 21 and 22) slidably mounted upon a common support 154 pivotally connected at 156 to a plate 158 secured by screws 160 to the casting 96. Secured to each holder 152 by screws 162 is a thin shoe-engaging or ironing plate 164 of resilient metal and a relatively thick plate 166 of resilient metal which acts as a support for the plate 164, the plates 164, 166 being substantially flat for engagement with the lasted margin of the upper along the sides of the heel-end portion of the shoe bottom. Extending outwardly from one edge of the plate 166 in directions substantially normal to the edge curvature of the heel end of the shoe are a plurality of slots 168 (Fig. 20) which divide the plate into a series of fingers 170 downward movement of which is limited by a forwardly extending plate 172 underlying the inner end portions of the fingers 170 and secured to the holder 152 by screws 174. At their outer edges the plates 164, 166 engage a shoulder 176 on the holder 152. Overlying the plate 164 and arranged to engage the lasted margin of the upper at the extreme rear end portion of the shoe is a thin flexible resilient plate 178 secured by screws 180 to an upwardly extending member 182 (Fig. 19). The member 182 is fastened to the end face of the pivoted support 154 by screws 184 which serve also to secure to the end face of the support an inverted substantially L-shaped member 186 having a toewardly extending portion 188 which is arranged to engage the holders 152 of the heel-end ironing units in laterally extending slots 190 formed in the holders.

Each of the shank ironing units comprises a holder 192 (Fig. 20) having formed thereon bosses 194, 196 bored to receive pivot pins 195, 197 carried by bosses 198, 200 formed respectively on the holders 116, 152 of the forepart and heel-end ironing units, the bosses 198, 200 being counterbored to receive the heads of the pivot pins and set screws 202, 204 being provided for holding the pins 195, 197 against endwise movement in the bosses. Formed on each holder 192 are curved surfaces 206, 208 (Figs. 21 and 22) arranged to engage similarly curved seats 210, 212 formed respectively on the holders 116 and 152, the curved surface 206 and its seat 210 being concentric with the axis of the pin 195 and curved surface 208 and its seat 212 being concentric with the axis of the pin 197. The holder 192 has also formed thereon a plurality of flat surfaces 214 (Fig. 21) on which rest a plurality of U-shaped springs 216 the inner end portions of which are held in spaced relation by pins 218 (Fig. 24) extending upwardly from the holder 192 and through the lower arms of the U-shaped springs 216. Surrounding each of the pins 218 between the lower and upper arms of each of the U-shaped springs is a compression spring 220. At their outer closed ends the U-shaped springs are held in spaced relation by fingers 222 formed on a member 224 secured to the holder 192 by screws 226 (Fig. 24). Overlying the U-shaped springs 216 is a thin shoe-engaging or ironing plate 228 of resilient metal shaped to conform substantially to the lengthwise curvature of the shank portion of the shoe. The plate 228 is fastened by rivets 230 to the inwardly extending arms 232 of a spring clip 234 having an upwardly bent central portion 236 through which extends a shouldered screw 238 threaded into the holder 192 (Fig. 24). Near its inner end each U-shaped spring 216 has projecting upwardly from its lower arm a shouldered pin 240 riveted to the lower arm, the pins 240 being arranged, by engagement with the upper arms of the U-shaped springs, to limit downward bending of the inner portion of the shoe-engaging plate 228.

In the illustrated construction, the shoe-engaging plate 134 of each forepart unit extends somewhat heelwardly of the junction of the forepart and shank portions of the shoe, the heelwardly extending portion 242 (Fig. 20) of the plate 134 being curved similarly to and overlying the shank ironing plate 228. Overlying the shank ironing plate 228 is the toewardly projecting portion 244 of the heel-end ironing plate 164, this projecting portion being also curved similarly to the shank ironing plate. As herein shown, the forepart, shank and heel-end ironing units for engaging the lasted margin of the upper at the opposite sides of the shoe bottom are mounted on the casting 96 between side plates 246 each of which is provided with a depending portion 248 (Fig. 19) which is slotted to receive the bushing 128 and is counterbored to receive a head 250 formed on the outer end of the bushing. Extending through an elongated slot 252 in each side plate 246 is a shouldered screw 254 threaded into the holder 152 of the heel-end ironing unit, a washer 256 being provided between the head of the screw and the side plate. By reason of their overlapping relation the ironing plates 134, 228 and 164 of the forepart, shank and heel-end units are arranged to engage the lasted margin of the upper along the opposite sides of the shoe bottom continuously from its toe to its heel-end portion, the flexible plate 178 engaging the lasted margin of the upper at the extreme rear end portion of the shoe. The ironing plates 134, 228 and 164 are long enough to accommodate shoes of different sizes and preferably the ironing plates 134 of the forepart units are shaped to conform nearly to the lateral curvature of the bottom of the forepart of the shoe.

In order to accommodate shoes of different styles, that is, shoes mounted upon lasts designed to accommodate heels of different heights, means is provided, which will now be described, for relatively adjusting the forepart, shank and heel-end units heightwise of the shoe to vary the lengthwise contour of the ironing plates 134, 228 and 164 in accordance with variations in the lengthwise curvature of the bottom faces of shoes of different styles. As shown, particularly in Figs. 19, 21 and 22, the holder 116 of one of the forepart ironing units is provided with a circular seat for the ball-shaped upper end of a rod 258 which is threaded into a sleeve 260 (Fig. 19) recessed to receive a projection 262 formed on a rod 264 which extends downwardly through an enlarged opening 266 in a laterally extending shaft 268 supported by depending ears 270 on the casting 96. The ball-shaped end of the rod 258 is held in engagement with its seat by means of a plate 272 secured to the holder 116 by screws 274. The rod 264 is pinned to the sleeve 260 and has a curved shouldered portion 276 engaging a similarly shaped seat formed on the shaft 268. Pinned to the rod 264 is a collar 278 engaging a flat surface 280 on the shaft 268. Surrounding the rod 264 between a flange 282 formed on a hand wheel 284 pinned to the lower end of the rod and the flat surface 280 is a compression spring 286 which acts frictionally to hold the rod 264 against free turning movement. Formed on the holder 116 to which the rod 258 is connected are laterally extending projections 288 (Figs. 21 and 22) arranged to engage finished surfaces on the bottom face of the holder 116 of the forepart ironing unit that engages the lasted margin of the upper at the opposite side of the shoe bottom. It will be evident that by rotation of the hand wheel 284 the forepart holders 116 may be swung about the axis of the shaft 118 to raise or lower the pivot pins 195. As the pivot pins 195 are thus raised or lowered the forepart and shank holders 116 and 192 are rotated relatively to one another about the axis of the pins 195 to vary the angle between the ironing plates 134 of the forepart units and the ironing plates 228 of the shank units and thus to vary the contour defined by the plates 134, 228 and 164 lengthwise of the shoe in accordance with variations in the heightwise curvature of the bottoms of shoes mounted upon lasts designed to accommodate heels of different heights. For the convenience of the operator there is pivotally connected to the casting 96 a pointer 290 (Fig. 19) which is arranged to cooperate with a scale 292 on an arc-shaped member 294 fastened to the casting 96 and to indicate the different adjusted positions of the forepart ironing units in operating upon shoes mounted upon lasts designed to carry heels of different heights, the pointer being swung as the forepart units are adjusted by means of an arm 296 connected to one of the holders 116 by a screw 298 extending through an elongated slot 300 in the arm. It will be understood that as the forepart units are thus adjusted the shank and heel-end units may move lengthwise of the shoe by reason of the slotted connection between the holders 152 of the heel-end units and the member 186. In order that the shank and heel-end ironing units may be adjusted relatively to the forepart units as may be necessary in operating upon shoes designed to carry comparatively high heels, there is connected to the support 154, on which rest the heel-end ironing units, a rod 302 which extends downwardly through a central bore in a shaft 304 supported by depending ears 306 on the casting 96. The rod 302 is threaded into a yoke 303 which extends through an enlarged opening in the plate 158 and is pivotally connected at 305 to the support 154. The rod 302 is held against endwise movement relatively to the shaft 304 by means of a collar 308 formed on the rod and engaging a flat surface 310 on the shaft and a collar 312 pinned to the rod and engaging a flat surface 314 formed on the opposite side of the shaft. Pinned to the lower end portion of the rod 302 is a hand wheel 316 for turning it and surrounding the rod between a flange 318 on the hand wheel and the flat surface 314 on the shaft 304 is a compression spring 320 which tends frictionally to hold the hand wheel against turning movement. It will be understood that by turning the hand wheel 316 the support 154 may be swung about its pivot to vary the angle between the heel-end ironing plates 164 and the shank ironing plates 228. As the support 154 is thus swung the pivot pins 197 are raised or lowered to move the shank ironing units relatively to the forepart ironing units to give the ironing plates 134, 228 and 164 the required pronounced longitudinal contour. A pointer 315 secured to the plate 158 by screws 317 (Figs. 19 and 21) and cooperating with a scale 319 on the member 186 indicates different adjusted positions of the heel-end ironing units. Each side plate 246 is formed integral with a pair of slides 322 mounted in guideways 324 formed in the casting 96, each slide being held in its guideway by a cover plate 326 fastened to the casting 96 by screws 328. Arranged to engage each slide 322 in a recess 330 formed in the slide is the rounded upper end of one arm 332 of a bell-crank lever 334, the other arm of which is connected by a link 336 to the slide 94. When the machine is initially at rest the forepart, shank, and heel-end ironing units of that set of instrumentalities which is in its lowermost position in the machine are held in their outermost positions by the side plates 246 and the above-described connections to the slide 94. As thus positioned, the ironing plates 134, 228 and 164 are arranged to receive and support a previously lasted shoe presented initially by the operator bottom downward by engagement with the overlaid marginal portion of the upper along the opposite sides of the shoe substantially from the toe end to the heel end of the shoe with the extreme heel-end portion of the shoe in engagement with the plate 178. It will be understood that the last and shoe will have been previously mounted on the heel pin 46 and that the holder 70 will have been moved with the last and shoe as the shoe is placed initially on the ironing plates 134, 228 and 164. It will be understood also that in the upward movement of the slide 94 the shoe and the holder 70 are first moved into engagement respectively with the shoe rest 42 and with an abutment 338 (Fig. 1) formed on the member 54 before any substantial amount of pressure is applied to the bottom of the shoe and that the member 54 may rock more or less about the axis of the rod 56 to move the shoe rest 42 into engagement with the shoe or the abutment 338 into engagement with the holder 70 as may be necessary to accommodate lasts of different heights. With the shoe rest 42 in engagement with the shoe and the abutment 338 in engagement with the holder 70, the pivoted member 54 is moved upwardly with the last and shoe until its curved upper edge 340 (Fig. 1) engages a correspondingly curved seat 342 on the carrier 38, the pin 58 extending through an elongated slot 344 in the member 54 to permit this upward movement. Thereafter the member 54 is held frictionally against further rocking movement and in response to the pressure of the shoe upon them the plates 134, 228 and 164 are flexed to conform more closely to the contour of the shoe bottom and yield downwardly until the fingers 140 of the plates 136 engage the curved ribs 148, 150 on the member 146, the fingers 170 of the plates 166 engage the plates 172, and the upper arms of the U-shaped springs 216 engage the pins 240 carried by the lower arms of the springs. In the continued upward movement of the slide 94 the pressure of the plates 134, 228 and 164 on the overlaid margin of the upper is progressively increased as the spring 98 is compressed until abutments 346 on the slide 94 engage abutments 348 on the casting 96, after which relatively heavy pressure is applied to the shoe by means hereinafter described. As the spring 98 begins to yield in the upward movement of the slide 94 in response to the pressure of the shoe on the ironing plates, the links 336 act to swing the bell-crank levers 334 in directions to move the side plates 246 and the forepart, shank and heel-end ironing units at the opposite sides of the shoe toward each other, the ironing plates 134, 228 and 164 being thus moved bodily inward to iron the overlaid margin of the upper along the sides of the forepart, shank and heel-end portions of the shoe.

In order that the ironing plates 134 of the forepart units will act on the overlaid margin of the upper around the toe end of the shoe the inner edges of the plates when the forepart units are at their outermost positions are substantially parallel to the longitudinal median line of the forepart of the shoe and are cut away heelwardly of the toe portion of the shoe to permit the toe end portions of the plates 134 to move into engagement with each other as they complete their inward movements. Secured to the holder 116 of one of the forepart units by means of the screws 132 is a thin flexible resilient plate 350 (Fig. 20) which extends inwardly between the toe portion of the ironing plate 134 and its supporting plate 136 at one side of the shoe, the inner end portion of the plate 350 extending also between the toe portion of the ironing plate 134 and its supporting plate 136 at the opposite side of the shoe when the forepart units are in their outermost positions. The plate 350 bridges the gap between the inner edges of the toe end portions of the ironing plates 134, thus affording substantial insurance that the overlaid margin of the upper at the extreme toe end will not be pinched between the ironing plates 134 as the toe end portions of these plates are brought together at the completion of their inward movements. By reference to Fig. 20 it will be seen that the forward edge portions of the plate 178 for engaging the lasted margin of the upper at the extreme rear end of the shoe are supported at each side of the shoe by a spring clip 352 fastened to the holder 152 by one of the screws 162. The plate 178 prevents marking of the upper at the extreme heel-end portion of the shoe as the plates 164 are moved inwardly to iron the overlaid margin along the sides of the heel-end portion. In order to eliminate any possibility of making the upper at the opposite sides of the shoe by the inwardly moving plates 134 and 164, the forward edge faces of the projections 242 of the plates 134 and the rear edge faces of the projections 244 of the plates 164 as well as the rear edge faces of the plate 178 are inclined at an angle to the direction of inward movement of the ironing plates.

In order to assist in ironing the overlasted margin of the upper free from wrinkles and setting it in lasted position, the machine herein shown is provided with means for maintaining the ironing plates in a heated condition. For this purpose there is secured to each of the holders 116, 192, and 152 at one side of the shoe, an electrical heating device 354 (Figs. 21 and 22) that extends inwardly beneath the ironing plates of the unit and also beneath the ironing plates of the corresponding unit at the opposite side of the shoe, the devices 354 being connected by suitable electrical connections to any convenient source of electrical energy for heating them. The ironing members of each unit are heated partly by radiation and partly by heat conducted to them from the holders 116, 192 and 152. Novel features of the construction hereinbefore described are claimed in a separate application Serial No. 185,347, filed January 17, 1938, in the name of Sidney J. Finn.

The upward movements of the slides 94 to operate the shoe bottom pressing or ironing means of the two sets of instrumentalities are effected by power through the action of fluid pressure means. For this purpose there is secured to each slide 94 by screws 358 a collar 360 (Fig. 18) that extends into the upper open end of a cylinder 362 formed integral with the bracket 24 and is secured to a piston 364 fitted to slide freely in the cylinder 362 by screws 365. The illustrated machine is provided with novel pressure restoring mechanism which is substantially like that fully shown and described in an application of Herbert B. Newhall, Serial No. 156,189, filed July 28, 1937. As shown particularly in Fig. 18, the piston 364 is formed in two parts, the upper part having a plurality of recesses 366 formed therein in which are seated springs 368 resting at their lower ends against the lower part 370 of the piston. The springs 368 act to hold the lower part 370 in a spaced relation to the upper part determined by a shoulder bolt 372 extending through central bores in the lower and upper parts of the piston and having threaded on its upper end a nut 374 between which and a finished surface 376 on the upper part there is a washer 377, a head 378 on the lower end of the bolt 372 engaging a counterbored surface 380 on the lower part. The bottom face of the part 370 of the piston is grooved to receive an annular packing ring 382 which is substantially U-shaped in cross-section and may be made of rubber or rubber-like material. The packing ring 382 is upheld within the groove in the part 370 by a flat ring 384 supported by a retaining plate 386 secured to the part 370 by a screw 388, an expanding ring 390 being provided which surrounds the flat ring 384 and acts to press the outer wall of the U-shaped packing ring 382 against the wall of the cylinder.

The cylinder 362 below the two-part piston 364 is provided with a chamber 392 into which fluid, preferably oil, may be introduced through a pipe 394 to move the piston upwardly. When there is no shoe in the machine upward movement of the piston 364 in the cylinder 362 is limited by the engagement of pins 396 carried by the slide 94 with links 398 at the upper ends of slots 400 formed in the links. The links 398 are pivotally connected to the bracket 24, one at each side of the cylinder 362, and surrounding each link between a washer 402 engaging a finished surface 404 on the bracket 24 and a washer 406 engaging a finished surface 408 on the slide 94 is a compression spring 410, the springs 410 being arranged to yield under the weight of the parts in the downward movement of the slide 94 which is limited by engagement of a flange 409 on the slide with the finished upper surface 411 of the cylinder 362 (Fig. 18). The pipe 394 connects the cylinder 362 and an opening 412 in a novel valve unit 414 (Fig. 4), hereinafter more particularly described, which controls the flow of fluid from the cylinder 362. Fluid is supplied by a gear pump 416 driven continuously through a belt 418 (Fig. 1) by an electric motor (not herein shown), the fluid being drawn from a tank 420 in the lower portion of the base 20 through a pipe 422 leading to the pump 416 and provided with a check valve 424, shown diagrammatically in Figs. 13, 14, 15, 16 and 17, for preventing the return of fluid through the pipe 422 back to the tank 420. From the pump 416 the fluid is led by a pipe 426 into an opening 428 in a valve casing 430 bored to provide a chamber 432 in which there is fitted a cylindrical valve, illustrated as a small piston 434, having a reduced shank portion 436 to which there is secured by a pin 438 a head 440 (Fig. 3). The valve 434 is normally in position to permit the fluid to return to the pump through a second opening 442 (Fig. 3) in the casing 430 connected by a pipe 444 to the pipe 422 (Figs. 13, 14, 15, 16 and 17). The chamber 432 in the casing 430 communicates with openings 446 in adjacent valve casings 448, each of which is bored to provide a chamber 450 in which there is fitted a three-position valve, illustrated as a small piston 452, having a reduced shank portion 454 connected by a pin 456 to a head 458. The valves 452 control the admission and exhaust of oil to and from the cylinders 362 of the machine. Each casing 448 has a second opening 459 formed therein through which fluid is fed to a pipe 460 connected to an opening 462 in the valve unit 414, the fluid passing through the opening 412 in the unit 414 and the pipe 394 into the cylinder 362. The fluid is exhausted from the cylinder back through the valve unit 414 and pipe 460 into the chamber 450 and thence downwardly through a hollow casting 464 to which there is secured a curved nozzle 466, the outlet end of which is positioned over the tank 420.

When the machine is initially at rest, the valve 434 is in the position indicated in Fig. 3, a spring 468, bearing at one end against the closed end 470 of the casing 430 and at the other end against the head 440 of the valve, tends to move the valve to the right. Movement of the valve 434 to the right (Figs. 3 and 10) is limited by the engagement of latches 472 (Fig. 5) with a flange 474 formed on the valve, the flange engaging each latch in a notch 476 formed in the latch. With the valve 434 in the position shown in Fig. 3 fluid is circulated idly from the pump 416 through the pipe 426, the chamber 432, and back through the pipes 444 and 422 to the pump (Fig. 13). Each latch 472 is pivotally connected to a bracket 475 secured to the valve casing 430 by screws 477 (Fig. 10) and is held by a spring 478 in engagement with a roll 480 carried by an adjustable abutment 482 secured to the upper end of one arm 484 of a bell-crank lever 486 pivotally connected at 488 to a bracket 490 secured to the base 20 by screws 492, one of which is shown in Fig. 3. The arms 484 are each connected to one of the valves 452 by a short link 494 and each arm is held normally in engagement with an adjustable stop, illustrated as a screw 496 threaded into the bracket 490, by a spring 498 extending between the arm 484 and the bracket 490. Loosely journaled upon a shaft 500 (Fig. 4) extending laterally of the machine and supported by suitable bosses on the base 20 is a treadle 502 for swinging each arm 484 in a direction to move the valve 452 into position to permit oil under pressure to be admitted to the cylinder 362 at that side of the machine the treadle of which has been depressed. Each treadle 502 has formed thereon bosses 504 through which extend adjustable screws 506 arranged to engage the opposite side faces of a lug 508 on an arm 510 also mounted on the shaft 500 and held against movement lengthwise of the shaft by a set screw 511, lock nuts 512 being provided for holding the screws 506 in adjusted positions. Pivotally connected to the upper end of the arm 510 is a bell-crank lever 514 having a rearwardly extending arm 516 carrying a plate 518 and a downwardly extending arm 520 connected by a spring 522 to a rearwardly extending projection 524 on the arm 510. The spring 522 tends to swing the bell-crank lever in a counter-clockwise direction (Fig. 3) and to hold it with a stop 526 on the arm 520 in engagement with a stop 528 on the arm 510, and with the plate 518 in position to engage a plate 530 secured to the arm 484. A spring 532 connected at one end to the hook-shaped head of a screw 534 threaded into the bracket 490 and at the other end to a plate 536 mounted to swing upon a shouldered stud 538 connecting the arm 510 and the bell-crank lever 514 acts through the arm 510 to uphold the treadle 502 with an adjustable stop, illustrated as a screw 540, carried by the treadle in engagement with a fixed abutment 542 on the base 20. Depression of the treadle 502 acts to swing the arm 510 and through the bell-crank lever 514 the arm 484 to the left (Fig. 3) to move the valve 452 into the position shown in Fig. 10 in which position the opening 459 in the chamber 450 is uncovered so that fluid may be admitted to the cylinder 362, the head 458 of the piston acting to close the chamber 450 between the opening or port 459 and the hollow casting 464. As the arm 484 is swung into the position shown in Fig. 10, the adjustable abutment 482 carried by the arm engages the end of the valve 434 and moves it into position to close the opening 442 in the casing 430, thus preventing the return flow of oil to the pump 416. With the valves 434 and 452 in the positions shown in Fig. 10, fluid is admitted to the cylinder 362 to raise the piston 364 and to impart upward movement to the slide 94 to cause the shoe bottom ironing means at that side of the machine, the treadle 502 of which has been depressed, to be operated in the manner hereinbefore described.

In order to limit the pressure of the ironing means on the bottom of the shoe there is provided a pressure control valve 544 which is not shown herein in detail since it is substantially the same as that shown in Fig. 33 and fully described in Letters Patent No. 2,047,185, granted July 14, 1936, upon an application of M. H. Ballard et al. An opening 546 in the casing 430 (Figs. 3 and 10) communicating with the opening 428 in the casing leads to the inlet side of the pressure control valve 544 and from the outlet side of the valve a pipe 548 leads to a valve unit 550 (Fig. 12) hereinafter described. It will be understood that the pressure control valve is held closed by means of a spring (not herein shown) which yields to permit the valve to open when the pressure of the fluid in the pipe 426 and the cylinder 362 is sufficient to overcome the tension of the spring and that the tension of the spring may be varied by means of a hand wheel 552 to permit passage of fluid through the valve at any desired predetermined pressure. The valve unit 550 (Fig. 12) comprises a casing 554 which is formed integral with the hollow casting 464 and is bored to provide a chamber 556 which opens at one end into an enlarged central opening 558 in the casing and at the other end is connected by an opening 560 to the hollow casting 464. Fitted to slide in the chamber 556 is a valve in the form of a small piston 562 having a forwardly extending grooved portion 564 extending into the opening 558 in the casing. At its opposite end the valve 562 is connected by a link 566 to an upwardly extending arm 568 of a bell-crank lever 570 mounted on a rod 572 supported by downwardly extending ears 574 (Fig. 4) on the valve casings 448. The bell-crank lever 570 has a pair of rearwardly extending arms 576 connected by links 578 to the rearwardly extending arms 516 of the bell-crank levers 514, each arm 516 carrying a shouldered screw 580 that extends through an elongated slot 581 in its associated link 578. The shouldered screw 580 in the arm 516 engages the link 578 at the upper end of the slot 581 in the link when the parts are in the positions shown in Fig. 12 with the port 560 closed by the valve 562. When the pressure in the cylinder 362, at that side of the machine the treadle of which has been depressed by the operator to move the valves 434 and 452 into the positions shown in Fig. 10 and illustrated diagrammatically in Fig. 14, is sufficient to overcome the resistance of the pressure control valve operating spring, the valve 544 opens permitting passage of the fluid through the pipe 548 and into the enlarged opening 558 in the valve casing 554. The pressure of oil in the opening 558 on the valve 562 causes the valve to be moved to the right (Fig. 12), this movement of the valve acting through the link 566, bell-crank lever 570 and link 578 to swing the bell-crank lever 514 in a direction to release the arm 484 to the action of the spring 498. Movement of the valve 562 to the right is limited by engagement of shoulders 565 on the grooved portion 564 of the valve with a shoulder 567 formed within the casing 554 by the opening 558 and the bore 556. Carried by each link 494 is a roll 582 engaging a bar 584 (Figs. 3, 5, 10 and 11) carried by the forwardly extending arm 586 of a bell-crank lever 588 supported between downwardly extending arms 590 (Fig. 5) on the bracket 475. The bell-crank lever 588 has a downwardly extending arm 592 connected by a link 594 to one arm 595 of a bell-crank lever 596 mounted to swing on a short rod 598 supported by the bracket 490. The bell-crank lever 596 has a rearwardly extending arm 600 between which and the bracket 490 there extends a spring 602 which tends to swing the bell-crank lever 596 and through the link 594 the bell-crank lever 588 in a direction to hold the bar 584 in engagement with the roll 582. As the arm 484 is released by the bell-crank lever 514, the spring 498 swings the arm rearwardly (Figs. 10 and 11). Movement of the arm in this direction is limited by engagement of the bar 584 with a shoulder 604 on the valve 452, the spring 602 acting to swing the arm 586 upwardly to move the bar into position to engage the shoulder 604 as the roll 582 is moved out of engagement with the plate in the rearward swinging movement of the arm 484, an adjustable screw 605 projecting from the bracket 490 engaging the arm 600 to limit its upward swinging movement. It will be understood that the arm 484 in the opposite half of the machine at this time is in the position shown in Fig. 3, the roll 582 carried by the link 494 connecting that arm to its associated valve 452 being out of engagement with the bar 584. Each valve 452 is provided with a circumferential groove 606 to provide clearance for the bar 584 as the arm is swung upwardly to position the bar for engagement with the shoulder 604 on one of the valves 452 when the other valve is in its initial position (Fig. 3). Movement of the arm 484 from the position shown in Fig. 10 to the position shown in Fig. 11 moves the valve 452 into position to cause the head 456 of the valve to close the opening 459 in the chamber 450, thus locking fluid under pressure in the cylinder 362. By reference to Fig. 10 it will be seen that the latch 472 rearwardly of the notch 476 has its lower edge face 608 shaped to permit it to be swung downwardly relatively to the arm 484 by the spring 478 as the arm is moved from the position shown in Fig. 3 to the position shown in Fig. 10, a second notch 610 being formed in the latch to provide clearance for the flange 474 on the valve 434 as the latch is thus swung. As the arm 484 is swung rearwardly from the position shown in Fig. 10 to the position shown in Fig. 11, the latch receives an upward swinging movement by engagement of the roll 480 with its lower edge face 608 to position it for engagement with the flange 474 in the notch 476 in the latch, the spring 468 acting to move the valve into engagement with the latch in this notch. With the valve 434 in this position the fluid again circulates idly from the pump 416 through the pipe 426, the chamber 432 and back through the pipes 444 and 422 to the pump.

It will be understood that while the valve 452 in one-half of the machine is in the position shown in Fig. 11, the shoe is maintained under pressure of the ironing means and the operator may present another shoe to the other half of the twin machine. As the operator depresses the treadle 502 of the other half of the machine to swing its associated arm 484 forwardly to move the valves 434 and 452 of that half of the machine from the positions shown in Fig. 3 to the positions shown in Fig. 10, the arm 586 is swung downwardly by engagement of the roll 582 with the bar 584, thereby releasing the arm 484 that is in the position shown in Fig. 11 to the action of its spring 498 which swings the arm rearwardly into engagement with the adjustable stop 496. As the arm 484 is thus swung the valve 452 connected to that arm is moved into the position shown in Fig. 3 in which position fluid is exhausted through the port 459 from one of the cylinders 362. The shoe previously operated upon is thus released from pressure and the ironing means at that side of the machine returns to its lowermost position in the machine. As the arm 484 is swung from the position shown in Fig. 11 to the position shown in Fig. 3, the roll 480 carried by the arm acts to impart an upward swinging movement to the latch 472. In order that the latch 472 will not be swung upwardly far enough to move it out of engagement with the valve 434 in the quick return of the arm 484 to starting position, there is provided an adjustable stop, illustrated as a screw 612, which is threaded into the base 20 and is provided with a head 614 for engaging the latches 472 to limit their upward swinging movement, a lock nut 616 being provided for holding the screw in adjusted position (Fig. 11).

The illustrated machine is further provided with means for swinging the arm 586 in a direction to move the bar 584 out of engagement with the shoulder 604 on the valve 452 to permit the spring 498 to move the arm 484 into engagement with the adjustable stop 496 and the valve 452 into position to permit fluid to be exhausted from the cylinder 362 after a shoe has been maintained under pressure of the ironing means for a predetermined length of time. This means, as herein illustrated, comprises a timing device which is operatively connected to the arm 586 in response to movement of the arm to position the bar 584 for engagement with the shoulder 604 on the valve 452. The timing device comprises a ratchet wheel 618 formed integral with a bushing 620 (Fig. 8) rotatively mounted in a bearing 622 formed on the bracket 490, and a pawl 624 pivotally connected to the upper end of an arm 626 which is oscillated continuously through connections to an eccentric shaft 628 (Fig. 3) which is geared to a second shaft 630 driven continuously through a belt 632 by a pulley 634 fast to the continuously driven gear pump shaft 636. A tension spring 638 connected at one end to the pawl 624 and at the other end to the arm 626 tends to hold the pawl in the position shown in Fig. 9 with a projection 640 on the pawl in engagement with a fixed stop 642 on the arm 626. Extending through the bushing 620 (Fig. 8) is a rod 644 on the inner end of which is slidably mounted a short bushing 646 which serves as a bearing for one arm 648 of a forked lever 650, the other arm 652 of which is supported by the bushing 620. Between the arms 648 and 652 of the lever 650 there is mounted on the rod 644 a small drum 654 which is threaded on the end portion of the bushing 620 and has a forwardly projecting portion 656 on which is mounted a downwardly extending arm 658 carrying a pin 660. The arm 658 is held against movement relatively to the drum by a pin 662 carried by the drum and to which there is secured one end of a chain 664. The drum 654 is provided with a circumferential groove 666 to receive the chain 664 the lower end of which is secured to a weight 668 which tends to rotate the drum 654, the arm 658 and the ratchet wheel 618 in a counterclockwise direction, as viewed in Figs. 6 and 7. Mounted on the end portion of the rod 644 opposite the bushing 646 is a finger 670 carrying a pin 672 arranged to extend into any one of a series of holes 674 formed in the ratchet wheel 618. The parts mounted on the rod 644 are held in spaced relation by the head 676 of the rod which bears against the finger 670, and a nut 678 threaded on the opposite end of the rod and engaging a head 680 formed on the bushing 646. Pivotally mounted on the rod 598 supported by the bracket 490 is a retaining pawl 682 which is urged toward the ratchet wheel 618 by a tension spring 684 connected at one end to the pawl and at the other end to the arm 600 of the bell-crank lever 596, the arm 600 having formed thereon a lateral projection 685 for limiting swinging movement of the pawl 682 toward the ratchet wheel by the action of the spring 684 thereon. Fig. 6 illustrates the initial positions of the parts with the finger 670 in engagement with the arm 600 and the retaining pawl 682 in engagement with one of the ratchet teeth 686 of the ratchet wheel 618. As the arm 626 receives an oscillatory movement in the direction of arrow A (Fig. 9) the pawl 624 engages one of the ratchet teeth 686 and moves the ratchet wheel in a clockwise direction. This causes the finger 670 through the arm 600 to move the pawl 682 out of engagement with the ratchet wheel which, together with the finger 670, is then moved in a counterclockwise direction by the action of the weight 668 thereon as the arm 626 is swung in the direction of the arrow B (Fig. 9). As the finger 670 is swung in a counterclockwise direction, the springs 602 and 684 return the arm 600 and the pawl 682 to the position shown in Fig. 6 so that, with the valves 452 in the position shown in Fig. 3, the ratchet wheel 618 is not rotated step by step in a clockwise direction but is merely oscillated in each rotation of the eccentric shaft 628. Movement of one of the valves 452, however, into the position shown in Fig. 10 by depression of its associated treadle 502 causes the roll 582 by engagement with the bar 584 to impart a downward swinging movement to the arm 586 and through the mechanism connected to the arm 600 to move the retaining pawl 682 out of engagement with the ratchet wheel 618. This permits the weight 668 to rotate the ratchet wheel 618 and to swing the finger 670 in a counterclockwise direction (Figs. 6 and 7) until the pin 660 carried by the arm 658 engages the arm 652 of the lever 650. Thereafter the ratchet wheel 618 is again oscillated idly until the valve 452 is moved into the position shown in Fig. 11. As the valve 452 is thus moved the spring 602 swings the arm 600 upwardly into engagement with the adjustable stop 605 and through the connected mechanism swings the arm 586 upwardly to position the bar 584 for engagement with the shoulder 604 on the valve 452. It will be understood that with the arm 600 in engagement with the adjustable stop 605 the retaining pawl 682 is held by the spring 684 in engagement with one of the ratchet teeth 686 so that the oscillations of the pawl 624 will become effective to rotate the ratchet wheel 618 for a predetermined length of time depending upon the setting of the finger 670 until the finger 670 is again moved into engagement with the arm 600 and moves the arm 600 downwardly. Downward movement of the arm 600 causes the arm 586 to be moved in a direction to move the bar 584 out of engagement with the shoulder 604 on the valve 452, thus permitting the spring 498 to swing the arm 484 in a direction to move the valve 452 again into exhausting position (Fig. 3). It will be evident that the timing device will act to release a shoe from the pressure of the ironing means in one half of the machine after the lapse of a predetermined length of time if the operator fails to depress the treadle 502 of the other half of the machine, and that the length of time during which the shoe is thus held under pressure may be varied and determined by adjustment of the finger 670 relatively to the ratchet wheel 618 to vary the position of the finger relatively to the arm 600 when the parts are in the positions shown in Fig. 7. It will be evident also that the position of the finger 670 relatively to the arm 600 at the beginning of the timing operation (Fig. 7) may be varied by movement of the lever 650 about the axis of the rod 644 to vary the extent of counterclockwise movement imparted to the finger 670 and the ratchet wheel 618 by the action of the weight 668 thereon. For thus swinging the lever 650 there is pivotally connected to the base 20 (Fig. 3) a hand lever 688 connected by a link 690 to the lever 650. The hand lever carries a spring-pressed pin 692 arranged to enter any one of a series of notches 694 formed in a bracket 696 secured to the base 20 by screws 698. By means of the hand lever 688 the operator may move the lever 650 into any one of a number of adjusted positions to vary the position of the finger 670 relatively to the arm 600 at the beginning of the timing operation and thus to vary the length of time during which shoes of different kinds may be held under pressure of the ironing means before the timing device acts to release the arm 484 to the action of its spring 498 to move the valve 452 into exhaust position and thus to release the shoe from pressure.

As previously pointed out, fluid is admitted to and exhausted from each of the cylinders 362 through the novel valve unit 414. Each valve unit 414 comprises a casing 700 (Fig. 4) provided with a vertical central bore 702 in which there is slidably mounted a plunger 704. Above the bore 702 the casing is counterbored to provide a chamber 706 the upper end of which is threaded to receive a connection 708 which is bored to provide the opening 412 connecting the chamber 706 and the pipe 394. The bore 412 in the connection 708 is in vertical alinement with the bore 702 which communicates with the pipe 460 through the opening or port 462. Seated within a central recess 710 in the plunger 704 is a spring 712 which acts to urge the plunger upwardly and to hold a ball valve 714 seated against the bottom face of the connection 708 with the ball valve extending partially into the bore 412. The lower end portion of the connection 708 is slotted or castellated and the upper end portion of the plunger 704 is reduced in thickness to permit fluid to flow from the pipe 460 through the opening 462 and the bore 702 into the chamber 706 and from the chamber 706 through the opening 412 and the pipe 394 into the cylinder 362 when the ball valve is in the position shown in Fig. 4. At its lower end the spring 712 bears against a shoulder 716 formed within a central recess in a plate 718 secured to the casing 700 by screws 720. The bottom face of the casing 700 is recessed to receive an annular packing ring 722 which is provided with a circular flange 724 that extends upwardly in a recess 726 in the casing 700 and is pressed against the plunger 704 by a flat ring 728 surrounding the flange 724. A small opening 730 leads from the chamber 706 into a small laterally extending passage 732 in the casing 700, the passage 732 leading into the bore 702. Extending into the passage 732 is a threaded plug 734 which may be adjusted to vary the size of the opening 730 and is held in adjusted position by a lock nut 736. When the valves 434 and 452 have been moved into the positions shown in Fig. 10 and indicated diagrammatically in Fig. 13 fluid will flow through the opening 459 in the casing 448, the pipe 460, the valve unit 414 and the pipe 394 into the cylinder 362 to raise the piston 364 to operate the shoe bottom ironing means in the manner previously described. It will be understood that the pressure of the operating fluid in the cylinder 362 and in the above described connections from the cylinder to the pump 416 is progressively increased to force the piston upwardly in the cylinder to cause the ironing means to press and iron the overlaid margin of the upper and then to apply relatively heavy pressure to the overlaid margin at the end of the ironing operation. When the pressure of the fluid in the cylinder is sufficient to overcome the resistance of the spring 712 the plunger 704 is moved downwardly until it engages the shoulder 716 on the plate 718, the ball valve 714, however, being held in the position shown in Fig. 4 by the pressure of the fluid against it. When the pressure of the fluid in the cylinder has reached a predetermined maximum the pressure control valve 544 opens, thereby permitting the fluid to pass through the pipe 548 and to operate the valve 562 to impart to the arm 516 a downward swinging movement thereby releasing the arm 484 and the valve 452 to the action of the spring 498 for movement into the positions shown in Fig. 11, the fluid being locked under pressure in the cylinder by the valve 452 when in this position. With the fluid locked under pressure in the cylinder 362 the ball valve 714 gravitates from the position shown in Fig. 4 to the position indicated in Fig. 16 in which position it is seated against the casing 700 at the upper end of the bore 702. Thereafter the bar 584 is moved out of engagement with the shoulder 604 on the valve either by the action of the timing device or by depression of the treadle 502 of the other half of the machine and the valve 452 is moved into exhaust position (Fig. 3) as the spring 498 swings the arm 484 rearwardly into engagement with the adjustable stop 496. With the valve 452 in this position, fluid is exhausted from the cylinder first through the small opening 730 and the passage 732 into the bore 702 and thence through the pipe 460, the chamber 450 and the hollow casting 464 into the tank 420 until the pressure of the fluid, which acts on the ball valve 714 to hold it seated against the casing 700 at the upper end of the bore 702, has been reduced sufficiently to permit the spring 712 acting through the plunger 704 to lift the ball valve from this seat, whereupon the fluid is exhausted directly through the bore 702 and the above described connections to the tank 420. It will be understood that the opening 730 is considerably smaller than the bore 702 so that the flow of the fluid as it is exhausted from the cylinder is first at a slow rate and then at a relatively greater rate after the pressure has been reduced to such an extent as to avoid any sudden release of the parts such as might tend to damage them. Novel features of the valve unit disclosed for restricting the flow of fluid from the cylinders are claimed in another application Serial No. 208,870, filed May 19, 1938, in the name of F. Stratton.

The illustrated machine is further provided with means whereby the operator may release a shoe from the pressure of the ironing means in either half of the machine at any time. For this purpose there is mounted in suitable bearings on the base 20 a rockshaft 738 to which there is secured a treadle 740 provided with a rearwardly extending arm 742 (Fig. 3) connected by means of an adjustable link 744 to a rearwardly extending projection 746 on the bell-crank lever 588. The link 744 has formed therein an elongated slot 748 through which extends a pin 750 carried by the projection 746. Normally the treadle 740 is upheld by a spring 752 connected at one end to the base 20 and at the other end to the treadle with the pin 750 engaging the link 744 substantially at the lower end of the slot 748 and with an adjustable screw 754 carried by the treadle 740 engaging a fixed abutment 756 on the base 20 (Fig. 4). Secured to the rearwardly extending arm 742 of the treadle 740 is a block 758 arranged upon depression of the treadle to engage one or the other of two blocks 760 carried by the forwardly and downwardly extending arms 762 of the bell-crank levers 486. The arrangement of the parts is such that after a shoe has been subjected to pressure of the ironing means in one half of the machine and the valve 452 has been moved into the position shown in Fig. 11, depression of the treadle 740 will act through the link 744 to swing the bell-crank lever 588 in a direction to move the bar 584 out of engagement with the shoulder 604 on the valve 452, thereby permitting the spring 498 to swing the arm 484 rearwardly to its initial position and to move the valve 452 into exhaust position. If the spring 498, however, fails to act on the arm 484 by reason, for example, that the spring has become disconnected either from the arm 484 or the base 20 or is broken, or if the spring has become fatigued and fails to swing the arm 484 rearwardly far enough to move the valve 452 into exhaust position, the operator may, by further depression of the treadle 740, cause the block 758 by engagement with the block 760 to impart to the arm 484 a positive rearward swinging movement to initial position.

Secured to the rockshaft 738 are arms 764, one of which is shown in Fig. 4, having pivotally connected thereto adjustable links 766. At its opposite end each link 766 is pivotally connected to a rod 768 vertically movable in a guideway formed in the cover plate 718 of one of the valve units 414, each rod extending upwardly within the central recess 710 formed in its associated plunger 704. The length of each rod 768 is such that when the ball valve 714 is in the position indicated in Fig. 14 with the operating fluid locked under pressure in the cylinder 362 the rod is not in engagement with the plunger at the upper end of the recess 710. Depression of the treadle 740, however, far enough to swing the lever 588 into the position in which the bar 584 is out of engagement with the shoulder 604 on the valve 452 moves the rod 768 upwardly into engagement with the plunger 704. Thereafter further depression of the treadle acts through the plunger 704 to lift the ball valve 714 out of engagement with its seat on the casing 700 at the upper end of the bore 702. The operator may thus cause the fluid to be exhausted directly through the bore 702 from the cylinder 362 and the ironing means to be moved quickly to its lowermost position in the machine for the removal of the shoe if he observes that the shoe has been subjected for too long a time to the pressure and heat of the ironing means.

The relative positions of the different valves at different times in the cycle of the machine to control the different paths taken by the operating fluid are illustrated diagrammatically in Figs. 13, 14, 15, 16 and 17, the pipes through which the fluid flows from the tank 420 to the cylinders 362 and from the cylinders 362 back to the tank being only partially shown in the detailed drawings for clearness of illustration of other portions of the structure. Fig. 13 illustrates the relative positions of the valves 434 and 452 at that side of the machine the shoe bottom pressing or ironing means of which is in its lowermost position, the fluid circulating from the pump 416 through the pipe 426, the valve casing 430 and back through the pipes 444 and 422 to the pump. In the operation of the machine, after the operator has adjusted the ironing plates 134, 228 and 164 for the style of shoe to be operated upon and has mounted a shoe on the heel pin 46 and has positioned it upon the ironing plates in proper relation lengthwise and widthwise of the machine he depresses the treadle 502 at that side of the machine to move the valves 434 and 452 into the positions indicated in Fig. 14 to close the port 442 and to open the port 459 to cause the fluid to flow through the pipe 460 and the valve unit 414 into the cylinder 362. The pressure of the fluid on the piston 364 causes it to rise and to operate the shoe bottom ironing means in the manner previously described. It will be understood that as the pressure is built up in the cylinder 362 the lower part 370 of the piston moves relatively to the upper part thereby compressing the springs 368. When a predetermined pressure of the fluid in the cylinder is attained, determined by the setting of the pressure control valve 544, the overflow of fluid from the valve 544 passes through the pipe 548 (Fig. 15) and operates the valve 562 to disconnect the arm 484 from the arm 516. This permits the spring 498 to swing the arm 484 rearwardly and to move the valve 452 into position to close the port 459, the spring 468 acting in the rearward swinging movement of the arm 484 to move the valve 434 into position to open the port 442 (Fig. 16) and the spring 602 acting through the arm 600 and the connected mechanism to swing the bell-crank lever 588 upwardly to position the bar 584 for engagement with the shoulder 604 on the valve 452 to retain it in neutral position with the fluid locked under pressure in the cylinder 362. Thereafter the shoe remains under pressure of the ironing means, the springs 368 expanding to maintain substantially the applied pressure on the shoe if there is any leakage of oil from the cylinder, until the operator depresses the treadle 502 of the other half of the machine or the timing device acts to swing the bell-crank lever 588 in a direction to release the valve 452 for movement into exhaust position. It will be evident that if the operator depresses the treadle 502 of the other half of the machine before the timing device acts the bell-crank lever 588 will be swung in the direction to release the valve 452 for movement into exhaust position by the action of the roll 582 of the other half of the machine on the bar 584, so that as fluid is admitted to one of the cylinders 362 it is being exhausted from the other cylinder through the casing 448, the hollow casting 464 and the nozzle 466 into the tank 420 (Fig. 17). It will be understood that the fluid is exhausted from each of the cylinders 362 through the valve unit 414 connected to that cylinder, each valve unit 414 acting to restrict the flow of fluid until the pressure of the fluid has been reduced sufficiently to avoid any sudden release of the parts. It will be understood also that the operator may cause the ironing means of either half of the machine to return quickly to its initial position for the removal of a shoe by the use of the treadle 740 to release one of the valves 452 and to move it into exhaust position and to render the valve unit 414 ineffective to restrict the flow of fluid from the cylinder.

Having described the invention, what I claim as new and desire to secure by Letters Patent of the United States is:

1. In a machine for applying pressure to the bottoms of shoes, shoe bottom pressing means arranged to receive and support a shoe presented by the operator bottom downward, an abutment above said pressing means, a fluid operated piston for effecting movement of said shoe bottom pressing means and the shoe relatively to said abutment heightwise of the shoe to apply the pressure and then to release the shoe, a continuously operating pump for supplying fluid under pressure to said piston, and a pressure control valve for determining variably the amount of pressure applied to the shoe.

2. In a machine for operating on shoes, the combination with means for applying pressure to a shoe, of fluid pressure means for effecting relative movement of said pressure-applying means and the shoe to apply the pressure and then to release the shoe from pressure after an automatically determined length of time.

3. In a machine for operating on shoes, the combination with means for applying pressure to a shoe, of fluid pressure means for effecting relative movement of said pressure-applying means and the shoe to apply the pressure, and automatic means for controlling said fluid pressure means to release the shoe from pressure after the shoe has been maintained under pressure for a predetermined length of time.

4. In a machine for operating on shoes, the combination with means for applying pressure to a shoe, of fluid pressure means for effecting relative movement of said pressure applying means and the shoe to apply the pressure, and automatic means for controlling said fluid pressure means to release the shoe from pressure after the shoe has been maintained under pressure for a definite length of time, said automatic means being adjustable to vary the length of time during which the shoe is held under pressure.

5. In a machne for operating on shoes, the combination with means for applying pressure to a shoe, of fluid pressure mechanism for effecting relative movement of said pressure-applying means and the shoe to apply the pressure, a continuously operating pump for supplying fluid under pressure to said mechanism, a valve for controlling the flow of fluid to said mechanism, said valve having an inlet, a neutral and an exhaust position, and automatic means for moving the valve to neutral position whenever a predetermined pressure of the fluid is attained and for thereafter moving said valve to exhaust position after the shoe has been maintained under pressure for a predetermined length of time.

6. In a machine for operating on shoes, the combination with means for applying pressure to a shoe, of fluid pressure mechanism for effecting relative movement of said pressure-applying means and the shoe to apply the pressure, a continuously operating pump for supplying fluid under pressure to said mechanism, a valve for controlling the flow of fluid to said mechanism, said valve having an inlet, a neutral, and an exhaust position, a member movable by the operator to move said valve from exhaust to inlet position to connect the pump and said mechanism, and automatic means for moving said member reversely to disconnect the pump and said mechanism whenever a predetermined pressure of the fluid is attained and thus to determine the amount of pressure applied to the shoe.

7. In a machine for applying pressure to the bottoms of shoes, the combination with means for supporting a shoe against pressure applied to its bottom face, of shoe bottom pressing means, fluid pressure mechanism for effecting relative movement of said supporting means and the pressing means to press the shoe, a continuously operating pump for supplying fluid under pressure to said mechanism, valve mechanism for controlling the flow of fluid to said fluid pressure mechanism, and means operated by the pressure fluid for automatically controlling said valve mechanism to disconnect the pump and said fluid pressure mechanism whenever a predetermined pressure of the fluid is attained.

8. In a machine for applying pressure to the bottoms of shoes, the combination with means for supporting a shoe against pressure applied on its bottom face, and means for applying pressure to the bottom of the shoe, of fluid pressure mechanism for relatively moving said pressure-applying means and the supporting means to press the shoe, a continuously operating pump for supplying fluid under pressure to said mechanism, a valve for controlling the flow of fluid, said valve having an inlet, a neutral, and an exhaust position, operator-controlled means for moving said valve from exhaust to inlet position, means for disconnecting the valve and said last-named means, a spring for moving the valve from inlet to exhaust position, a member movable relatively to said valve for holding it in neutral position with the shoe under pressure in the machine, and a timing device for operating said member to release the valve to the action of its spring after the shoe has been maintained under pressure for a definite length of time.

9. In a machine for applying pressure to the bottoms of shoes, the combination with means for supporting a shoe against pressure applied on its bottom face, of means for applying pressure to the bottom of the shoe, a member for effecting relative movement of said pressing means and the supporting means to press the shoe, fluid pressure means for operating said member comprising a cylinder having a fluid operated piston mounted therein and connected to said member, a fluid pump having inlet and outlet pipes, a valve located between the inlet and outlet pipes, a spring tending to hold said valve open, a second valve between said outlet pipe and the cylinder, a spring tending to hold said valve closed, a member movable by the operator to close said first-named valve and to open said second-named valve to connect the pump and said cylinder, and mechanism controlled by the pressure fluid for moving said member reversely to lock fluid under pressure in said cylinder.

10. In a machine for applying pressure to the bottoms of shoes, the combination with means for supporting a shoe against pressure applied on its bottom face, and means for applying pressure to the bottom of the shoe, of fluid pressure mechanism for relatively moving said pressing means and the supporting means to press the shoe, a continuously operating pump for supplying fluid under pressure to said mechanism, a valve for controlling the flow of fluid, said valve having an inlet, a neutral, and an exhaust position, a spring acting to hold said valve normally in exhaust position, means for moving said valve against the resistance of said spring from exhaust to inlet position, means for disconnecting the valve and said last-named means, and automatic means for holding the valve in neutral position with the shoe under pressure in the machine and for releasing it to the action of its spring for movement to exhaust position after the shoe has been maintained under pressure for a predetermined length of time.

11. In a machine for applying pressure to the bottoms of shoes, the combination with means for supporting a shoe against pressure applied to its bottom face, and means for applying pressure to the bottom of the shoe, of fluid pressure mechanism for relatively moving said pressing means and the supporting means to press the shoe, a continuously operating pump for supplying fluid under pressure to said mechanism, a valve for controlling the flow of fluid, said valve having an inlet, a neutral, and an exhaust position, a spring acting to hold said valve normally in exhaust position, means for moving said valve against the resistance of said spring from exhaust to inlet position, mechanism operated by the pressure fluid for disconnecting the valve and said last-named means, a member movable into position to engage said valve and to hold it in neutral position, and means for operating said member at will to release the valve for movement to exhaust position.

12. In a machine for applying pressure to the bottoms of shoes, the combination with means for supporting a shoe against pressure applied on its bottom face, and means for applying pressure to the bottom of the shoe, of fluid pressure mechanism for relatively moving said pressing means and the supporting means to press the shoe, a continuously operating pump for supplying fluid under pressure to said mechanism, a valve for controlling the flow of fluid, said valve having an inlet, a neutral, and an exhaust position, a spring acting to hold said valve normally in exhaust position, means for moving said valve against the resistance of said spring from exhaust to inlet position, means for disconnecting the valve and said last-named means, an abutment movable into position to engage said valve and to hold it in neutral position with the shoe under pressure in the machine, a timing device arranged to operate said abutment to release said valve to the action of its spring for movement to exhaust position after the shoe has been maintained under pressure for a predetermined length of time, and operator-controlled means for operating said abutment prior to the action of said timing device.

13. In a machine for applying pressure to the bottoms of shoes, the combination with means for supporting a shoe against pressure applied on its bottom face, and shoe bottom pressing means, of fluid pressure mechanism for effecting relative movement of said shoe bottom pressing means and the supporting means to press the shoe, a continuously operating pump for supplying fluid under pressure to said fluid pressure mechanism, a valve located between said pump and the fluid pressure mechanism, said valve having an inlet and an exhaust position, operator-controlled means for moving said valve from exhaust to inlet position to connect said pump and the fluid pressure mechanism, a spring against the resistance of which the valve is thus movable, a pressure control valve arranged to permit escape of the fluid whenever a predetermined pressure of the fluid is attained, and mechanism operated by the escaped fluid for disconnecting the first-named valve and said operator-controlled means.

14. In a machine for applying pressure to the bottoms of shoes, the combination with means for supporting a shoe against pressure applied on its bottom face, and shoe bottom pressing means, of fluid pressure mechanism for effecting relative movement of said shoe bottom pressing means and the supporting means to press the shoe, a continuously operating pump for supplying fluid under pressure to said fluid pressure mechanism, a valve located between said pump and the fluid pressure mechanism, said valve having an inlet, a neutral, and an exhaust position, operator-controlled means for moving said valve from exhaust to inlet position to connect the pump and said fluid pressure mechanism, a spring against the resistance of which the valve is thus movable, a pressure control valve arranged to permit escape of the fluid whenever a predetermined pressure of the fluid is attained, mechanism operated by said escaped fluid for disconnecting said first-named valve and the operator-controlled means, a member for engaging said first-named valve and for holding it in neutral position with the shoe under pressure in the machine, and a timing device for moving said member out of engagement with said first-named valve after the shoe has been maintained under pressure for a definite length of time.

15. In a machine for applying pressure to the bottoms of shoes, the combination with means for supporting a shoe against pressure applied on its bottom face, and shoe bottom pressing means, of fluid pressure mechanism for effecting relative movement of said shoe bottom pressing means and the supporting means to press the shoe, a continuously operating pump for supplying fluid under pressure to said mechanism, a valve for controlling the flow of fluid, said valve having an inlet, a neutral, and an exhaust position, a controlling member swingable to move said valve from exhaust to inlet position, a treadle for swinging said controlling member, a spring connected to said controlling member for swinging it reversely to move the valve to exhaust position, means for releasing the controlling member to the action of its spring, a member for limiting the reverse movement of the controlling member and for holding the valve in neutral position, and a member movable to operate said member to release the controlling member at the will of the operator, said member being further movable to insure the return of said valve to exhaust position.

16. In a machine for applying pressure to the bottoms of shoes, the combination with means for supporting a shoe against pressure applied on its bottom face, of means for applying pressure to the bottom of the shoe, fluid pressure means for effecting relative movement of said supporting means and the pressing means to press the shoe comprising parts relatively movable in response to pressure of fluid against them, a continuously operating pump for supplying fluid under pressure to said fluid pressure means, valve mechanism for controlling the flow of fluid, and means operated by the pressure fluid for automatically controlling said valve mechanism to disconnect the pump and said fluid pressure means whenever a predetermined pressure of the fluid is attained.

17. In a machine for applying pressure to the bottoms of shoes, the combination with means for supporting a shoe against pressure applied on its bottom face, of means for applying pressure to the bottom of the shoe, fluid pressure means for effecting relative movement of said supporting means and the pressing means to press the shoe comprising a fluid operated piston, a cylinder in which said piston is slidably mounted, a continuously operating pump for supplying fluid under pressure to said cylinder, a valve for controlling the flow of fluid from said pump to the cylinder, and fluid-operated mechanism for moving said valve automatically into position to disconnect said pump and the cylinder whenever a predetermined pressure of the fluid is attained.

18. In a machine for applying pressure to the bottoms of shoes, the combination with means for supporting a shoe against pressure applied on its bottom face, of means for applying pressure to the bottom of the shoe, fluid pressure means for effecting relative movement of said supporting means and the pressing means to press the shoe comprising a fluid operated piston, a cylinder in which said piston is slidably mounted, a continuously operating pump for supplying fluid under pressure to said cylinder, a valve for controlling the flow of fluid to said cylinder, means for moving said valve in one direction to connect said pump and the cylinder, and fluid-operated means for moving the valve automatically in the opposite direction to disconnect the pump and said cylinder whenever a predetermined pressure of the fluid is attained.

19. In a machine for applying pressure to the bottoms of shoes, the combination with means for supporting a shoe against pressure applied on its bottom face, and means for applying pressure to the bottom of the shoe, of fluid pressure means for effecting relative movement of said pressing means and the supporting means to press the shoe, said fluid pressure means comprising a fluid operated piston, a cylinder in which said piston is slidably mounted, a continuously operating pump for supplying fluid under pressure, a valve for controlling the flow of fluid, said valve having an inlet, a neutral, and an exhaust position, means for moving said valve to inlet position to render the fluid effective to operate said piston, and means for moving said valve automatically to neutral position to cause the shoe to be held under pressure in the machine and then to exhaust position after the shoe has been maintained under pressure for a predetermined length of time.

20. In a machine for applying pressure to the bottoms of shoes, the combination with means for supporting a shoe against pressure applied on its bottom face, of a device for applying pressure to the bottom of the shoe, and fluid pressure means for relatively moving said pressing device and the supporting means to press the shoe comprising a fluid operated piston, a cylinder in which said piston is slidably mounted, a continuously operating pump for supplying fluid under pressure, a valve for controlling the flow of fluid, said valve having an inlet, a neutral, and an exhaust position, a member for moving said valve to inlet position, a spring acting on said member to hold the valve normally in exhaust position, means for releasing said member to the action of its spring when a predetermined pressure of the fluid is attained, a member movable into position to engage said valve and to hold it against the action of said spring in a neutral position with the shoe under pressure in the machine, and a timing device for operating said member to release said valve for movement to exhaust position after the shoe has been maintained under pressure for a predetermined length of time.

21. In a machine for applying pressure to the bottoms of shoes, the combination with means for supporting a shoe against pressure applied on its bottom face, and means for applying pressure to the bottom of the shoe, of fluid pressure means for relatively moving said pressing means and the supporting means to press the shoe comprising a fluid operated piston, a cylinder in which said piston is slidably mounted, a continuously operating pump for supplying fluid under pressure, a valve for controlling the flow of fluid, said valve having an inlet, a neutral, and an exhaust position, a member for moving said valve to inlet position, a spring acting on said member to hold the valve normally in exhaust position, means for releasing said member to the action of its spring when a predetermined pressure of the fluid is attained, a bar movable into position to engage said valve and to hold it against the action of said spring in a neutral position with the shoe under pressure in the machine, a timing device for operating said bar to release said valve for movement to exhaust position after the shoe has been maintained under pressure for a predetermined length of time, and operator-controlled means for operating said bar prior to the action of said timing device.

22. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump connected to said cylinders for supplying fluid under pressure thereto, a valve located between the pump and each of said cylinders, each valve having an inlet, a neutral, and an exhaust position, automatic means for moving either of said valves from inlet to neutral position whenever a predetermined pressure of the fluid is attained in the corresponding cylinder, and means to cause that valve to move from neutral to exhaust position upon movement of the other valve to inlet position.

23. In a machine for applying pressure to the bottoms of shoes, two sets of instrumentalities for applying pressure to shoes in different locations in the machine, different fluid pressure mechanisms for operating said sets of instrumentalities, a continuously operating pump for supplying fluid under pressure to said mechanisms, a valve located between said pump and each of said mechanisms, said valves each having an inlet, a neutral, and an exhaust position, spring means for holding each valve in exhaust position, a lever swingable by the operator to move each valve against the resistance of said spring means from exhaust to inlet position, means operated by the pressure fluid for releasing each valve to the action of said spring means, a member movable into position to engage either one of said valves and to hold it in neutral position, a timing device for moving said member out of valve engaging position after the lapse of a predetermined length of time, and means for moving said member out of valve engaging position prior to the action of said timing device upon movement of either one of said valves from exhaust to inlet position.

24. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump connected to said cylinders for supplying fluid under pressure thereto, a valve located between the pump and each one of the cylinders, said valves each having an inlet, a neutral, and an exhaust position, operator-controlled means for selectively moving said valves from exhaust to inlet position, automatic means for disconnecting each valve from its operator-controlled means whenever a predetermined pressure of the fluid is attained, and a member for engaging either one of said valves and for holding it in neutral position and for releasing it for movement to exhaust position upon movement of the other valve to inlet position.

25. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump, a connection between the pump and each of said cylinders, a valve in each connection for controlling the flow of fluid to and from one of the cylinders, said valves each having an inlet, a neutral, and an exhaust position, operator-controlled means for selectively moving said valves from exhaust to inlet position, means acting automatically to move each valve reversely whenever a predetermined pressure of the fluid is attained, a bar for limiting the reverse movement of both of said valves and for holding either of them in neutral position with a shoe under pressure in the machine, and a timing device for operating said bar to release either valve for movement to exhaust position after a shoe has been maintained under pressure for a predetermined length of time.

26. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump, a connection between the pump and each of said cylinders, a valve in each connection for controlling the flow of fluid to and from one of the cylinders, said valves each having an inlet, a neutral, and an exhaust position, operator-controlled means for selectively moving said valves from exhaust to inlet position, means acting automatically to move each valve reversely whenever a predetermined pressure of the fluid is attained, a bar for limiting the reverse movement of both of said valves and for holding either of them in neutral position with a shoe under pressure in the machine, a timing device for operating said bar to release either valve for movement to exhaust position after a shoe has been maintained under pressure for a predetermined length of time, and means for operating the bar to release either valve at the will of the operator.

27. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump, a connection between the pump and each of said cylinders, a valve in each connection for controlling the flow of fluid to and from one of the cylinders, said valves each having an inlet, a neutral, and an exhaust position, a controlling member swingable to move each valve from exhaust to inlet position, a treadle for swinging each controlling member, a spring connected to each controlling member for swinging it reversely to move each valve to exhaust position, means operated by the pressure fluid for releasing each controlling member to the action of its spring, a bar for limiting reverse movement of both said controlling members and for holding either one of them with its associated valve in neutral position, and a member movable to operate the bar to release either controlling member at the will of the operator.

28. In a machine for applying pressure to the bottoms of shoes, two sets of instrumentalities for applying pressure to shoes in different locations in the machine, a fluid operated piston for operating each of said sets of instrumentalities to press a shoe, cylinders in which said pistons are slidably mounted, a continuously operating pump, a connection between the pump and each of said cylinders, a valve in each connection for controlling the flow of fluid to and from one of the cylinders, said valves each having an inlet, a neutral, and an exhaust position, a controlling member swingable to move each valve from exhaust to inlet position, a treadle for swinging each controlling member, a spring connected to each controlling member for swinging it reversely to move each valve to exhaust position, means operated by the pressure fluid for releasing each controlling member to the action of its spring, a bar for limiting the reverse movement of both said controlling members and for holding either of them with its associated valve in neutral position, and a device movable to operate the bar to release either controlling member at the will of the operator, said device being further movable to insure the return of either valve to exhaust position.

29. In a machine for applying pressure to the bottoms of shoes, the combination with an abutment, of shoe bottom pressing means arranged to receive and support a shoe presented by the operator bottom downward, fluid pressure mechanism for moving said shoe bottom pressing means heightwise of the shoe to engage the shoe with said abutment and then to apply the pressure to the shoe, a continuously operating pump for supplying fluid under pressure to said mechanism, a single valve movable by the operator from exhaust to inlet position to connect the pump and said mechanism, and a pressure control valve for predetermining the amount of pressure applied to the shoe.

30. In a machine for applying pressure to the bottoms of shoes, the combination with an abutment, of shoe bottom pressing means arranged to receive and support a shoe presented by the operator bottom downward, a fluid operated piston for moving said shoe bottom pressing means heightwise of the shoe to engage the shoe with said abutment and then to apply the pressure to the shoe, a reservoir for fluid, a continuously operating pump for supplying fluid from said reservoir under pressure to said piston, a valve for controlling the flow of pressure fluid to and from said piston, manually operated means for moving said valve, and a pressure control valve located between the pump and said piston and arranged to open and return the fluid to said reservoir whenever a predetermined pressure of the fluid is attained.

31. In a machine for applying pressure to the bottoms of shoes, two sets of instrumentalities for applying pressure to shoes in different locations in the machine, said sets each comprising an abutment and shoe bottom pressing means arranged to receive and support a shoe presented bottom downward and movable heightwise of the shoe to engage it with said abutment and then to apply the pressure, a fluid operated piston for operating each of said seats of instrumentalities, cylinders in which said pistons are slidably mounted, a continuously operating pump connected to said cylinders for supplying fluid under pressure thereto, operator controlled valve means for connecting the pump and either one of said cylinders, and a pressure control valve for predetermining the amount of pressure applied to each piston.

32. In a machine for applying pressure to the bottom of shoes, the combination with two sets of instrumentalities for applying pressure to shoes in different locations in the machine, said sets each comprising an abutment and shoe bottom pressing means arranged to receive and support a shoe presented by the operator bottom downward and movable heightwise of the shoe to engage it with said abutment and then to apply the pressure, of a fluid operated piston for operating each of said sets of instrumentalities, cylinders in which said pistons are slidably mounted, a reservoir for fluid, a continuously operating pump for supplying fluid from said reservoir under pressure to said cylinders, operator controlled valve means for connecting the pump with either one of said cylinders, means providing a by-pass for the fluid from said pump to the reservoir, and a pressure control valve arranged to permit escape of fluid through said by-pass whenever a predetermined pressure of the fluid is attained in either cylinder.

33. In a machine for applying pressure to the bottoms of shoes, a pair of shoe abutments each arranged to engage the toe of a lasted shoe and the cone of the last, a pair of shoe bottom pressing devices each arranged to receive and support a shoe presented thereon by the operator bottom downward, a piston and cylinder for operating each of said shoe bottom pressing devices to raise the shoe and press it against its abutment, a tank for containing a liquid pressure medium, a continuously operating pump, connections from said pump to said cylinders, a pressure control valve between said pump and said cylinders for predetermining the pressure applied by said pump to said pistons, and manually controlled valve mechanism for directing the liquid pressure medium to either one of said cylinders.

AXEL A. LAWSON.